(12) United States Patent
Schwarz et al.

(10) Patent No.: US 9,772,399 B2
(45) Date of Patent: Sep. 26, 2017

(54) LIDAR SCANNER CALIBRATION

(71) Applicants: Brent S. Schwarz, Redwood City, CA (US); James A. Haslim, Dublin, CA (US); Nicholas M. Iturraran, Orinda, CA (US); Michael D. Karasoff, San Francisco, CA (US)

(72) Inventors: Brent S. Schwarz, Redwood City, CA (US); James A. Haslim, Dublin, CA (US); Nicholas M. Iturraran, Orinda, CA (US); Michael D. Karasoff, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/036,768

(22) PCT Filed: Nov. 11, 2014

(86) PCT No.: PCT/US2014/066901
§ 371 (c)(1),
(2) Date: May 13, 2016

(87) PCT Pub. No.: WO2015/077614
PCT Pub. Date: May 28, 2015

(65) Prior Publication Data
US 2016/0306032 A1    Oct. 20, 2016

Related U.S. Application Data

(60) Provisional application No. 61/907,951, filed on Nov. 22, 2013.

(51) Int. Cl.
*G01C 25/00*    (2006.01)
*G01S 7/497*    (2006.01)
(Continued)

(52) U.S. Cl.
CPC ............ *G01S 7/497* (2013.01); *G01S 7/4812* (2013.01); *G01S 7/4861* (2013.01);
(Continued)

(58) Field of Classification Search
CPC ...... G01S 7/497; G01S 7/4812; G01S 7/4865; G01S 7/52006; G01S 17/00
See application file for complete search history.

(56) References Cited

U.S. PATENT DOCUMENTS 5,054,911 A * 10/1991 Ohishi ................ G01B 11/026
                                                                 356/5.07
5,317,148 A    5/1994 Gray et al.
(Continued)

FOREIGN PATENT DOCUMENTS

CN    101273282 A    9/2008
DE    19732776 C1    2/1999
(Continued)

OTHER PUBLICATIONS

Office Action dated Jun. 29, 2017 in CN 201480072487.2.

*Primary Examiner* — Michael A Lyons
*Assistant Examiner* — Maurice Smith
(74) *Attorney, Agent, or Firm* — Mahamedi IP Law LLP

(57) ABSTRACT

A LiDAR can include a laser, an avalanche photodiode, a splitter, and a processor. The laser can be configured to emit a narrow electromagnetic pulse. The avalanche photodiode can be configured to receive one or more electromagnetic pulses and output a response signal in response to said pulses. The photodiode can also be positioned to receive at least one reflected pulse, reflected by an object external from the LiDAR sensor and caused by the laser. The avalanche photodiode can also have a bias voltage applied to it affecting the response signal. The splitter can be positioned to receive the narrow electromagnetic pulse and split it into
(Continued)

at least one external pulse directed toward the object external from the LiDAR sensor and at least one calibration pulse directed toward the photodiode. The calibration pulse directed toward the photodiode can be received by the photodiode before the pulse reflected by the object. The processor can be configured to receive response signals from the photodiode. Further, the processor can be configured to adjust the bias voltage according to a response signal caused by the calibration pulse to compensate for temperature changes of the photodiode.

23 Claims, 10 Drawing Sheets

(51) Int. Cl.
*G01S 17/89* (2006.01)
*G01S 17/10* (2006.01)
*G01S 7/481* (2006.01)
*G01S 7/486* (2006.01)
*G01S 17/42* (2006.01)

(52) U.S. Cl.
CPC ............ *G01S 17/105* (2013.01); *G01S 17/89* (2013.01); *G01S 7/4818* (2013.01); *G01S 7/4972* (2013.01); *G01S 17/42* (2013.01)

(56) References Cited

U.S. PATENT DOCUMENTS

| | | | |
|---|---|---|---|
| 5,463,709 A | 10/1995 | Terao et al. | |
| 5,489,149 A | 2/1996 | Akasu | |
| 5,500,520 A | 3/1996 | Komine | |
| 5,510,890 A | 4/1996 | Langdon et al. | |
| 5,553,087 A | 9/1996 | Telle | |
| 5,833,202 A | 11/1998 | Wolfgang | |
| 5,838,239 A * | 11/1998 | Stern | B64D 15/20 340/583 |
| 5,838,478 A | 11/1998 | Hippenmeyer et al. | |
| 5,844,708 A | 12/1998 | Anselment et al. | |
| 5,949,530 A | 9/1999 | Wetteborn | |
| 5,991,011 A | 11/1999 | Damm | |
| 6,088,085 A | 7/2000 | Wetteborn | |
| 6,310,682 B1 | 10/2001 | Gavish et al. | |
| 6,501,539 B2 | 12/2002 | Chien et al. | |
| 6,512,518 B2 | 1/2003 | Dimsdale | |
| 6,512,574 B2 | 1/2003 | Lai et al. | |
| 6,563,105 B2 | 5/2003 | Seibel et al. | |
| 6,710,324 B2 | 3/2004 | Hipp | |
| 6,734,849 B2 | 5/2004 | Dimsdale et al. | |
| 6,747,747 B2 | 6/2004 | Hipp | |
| 6,757,467 B1 | 6/2004 | Rogers | |
| 6,759,649 B2 | 7/2004 | Hipp | |
| 6,847,462 B1 | 1/2005 | Kacyra et al. | |
| 6,852,975 B2 | 2/2005 | Riegle et al. | |
| 6,898,218 B2 | 5/2005 | McCarthy | |
| 6,989,890 B2 | 1/2006 | Riegl et al. | |
| 7,030,968 B2 | 4/2006 | D'Aligny et al. | |
| 7,041,962 B2 | 5/2006 | Dollmann et al. | |
| 7,190,465 B2 | 3/2007 | Froehlich et al. | |
| 7,193,690 B2 | 3/2007 | Ossig et al. | |
| 7,323,670 B2 | 1/2008 | Walsh et al. | |
| 7,345,271 B2 | 3/2008 | Boehlau et al. | |
| 7,372,551 B1 | 5/2008 | Delfyett et al. | |
| 7,453,553 B2 | 11/2008 | Dimsdale | |
| 7,485,862 B2 | 2/2009 | Danziger | |
| 7,589,826 B2 | 9/2009 | Mack et al. | |
| 7,649,617 B2 * | 1/2010 | Walsh | G01C 15/002 356/4.01 |
| 7,697,120 B2 | 4/2010 | Reichert et al. | |
| 7,697,748 B2 | 4/2010 | Dimsdale et al. | |
| 7,701,558 B2 | 4/2010 | Walsh et al. | |
| 7,924,895 B2 | 4/2011 | McCarthy et al. | |
| 8,040,525 B2 | 10/2011 | Bridges et al. | |
| 8,120,780 B2 | 2/2012 | Bridges et al. | |
| 8,174,682 B2 | 5/2012 | Suzuki et al. | |
| 8,406,950 B2 | 3/2013 | Erb et al. | |
| 8,947,659 B1 * | 2/2015 | Baastians | H01L 31/107 356/301 |
| 9,002,151 B2 | 4/2015 | Woodward et al. | |
| 2002/0139920 A1 | 10/2002 | Seibel et al. | |
| 2003/0066947 A1 | 4/2003 | Alwan et al. | |
| 2006/0219872 A1 | 10/2006 | McVey | |
| 2007/0041083 A1 | 2/2007 | Di Teodoro et al. | |
| 2007/0058989 A1 * | 3/2007 | Kaku | H04B 10/672 398/209 |
| 2007/0188735 A1 | 8/2007 | Braunecker et al. | |
| 2009/0016392 A1 | 1/2009 | Wong | |
| 2009/0142066 A1 | 6/2009 | Leclair et al. | |
| 2009/0268193 A1 | 10/2009 | Ohishi | |
| 2009/0316134 A1 | 12/2009 | Michael et al. | |
| 2009/0323074 A1 | 12/2009 | Klebanov | |
| 2011/0291017 A1 | 12/2011 | Frach | |
| 2011/0292371 A1 | 12/2011 | Chang | |
| 2012/0154783 A1 | 6/2012 | Goldberg et al. | |
| 2014/0231647 A1 * | 8/2014 | Chinn | G01S 17/10 250/338.4 |
| 2014/0268098 A1 * | 9/2014 | Schwarz | G01C 3/08 356/4.07 |

FOREIGN PATENT DOCUMENTS

| | | |
|---|---|---|
| EP | 1 813 964 A2 | 8/2007 |
| EP | 2372389 A1 | 10/2011 |
| JP | 10197635 | 7/1998 |
| WO | WO 2007/012878 A1 | 2/2007 |

\* cited by examiner

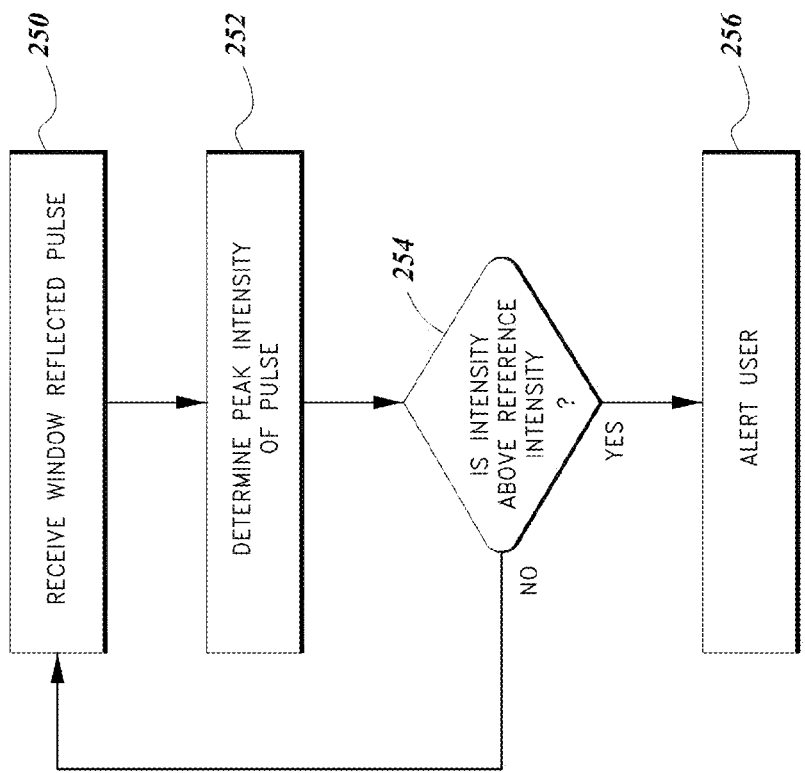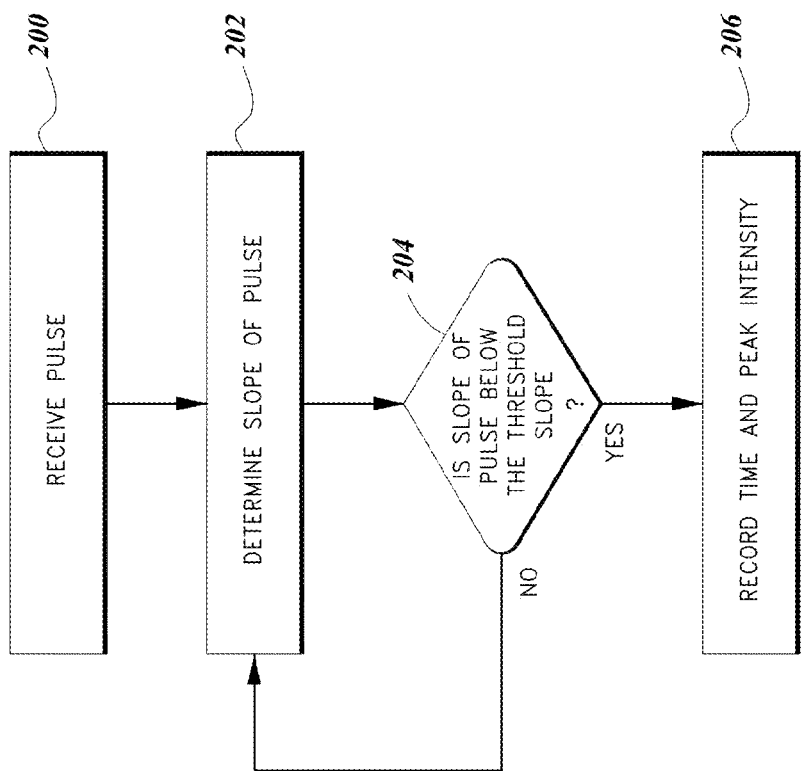

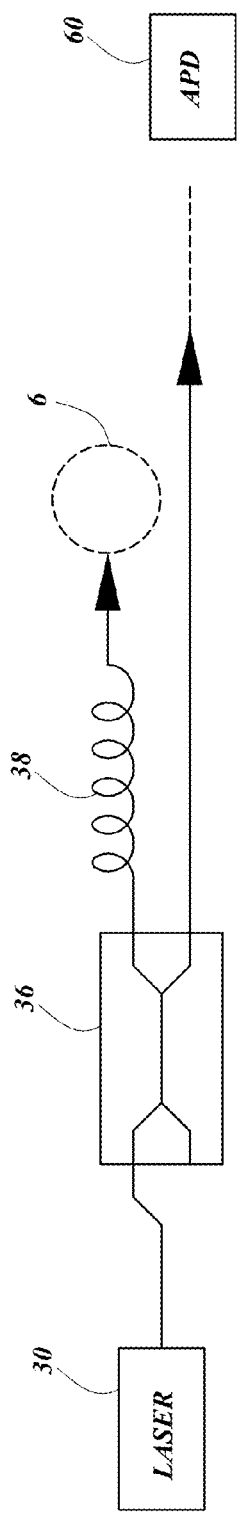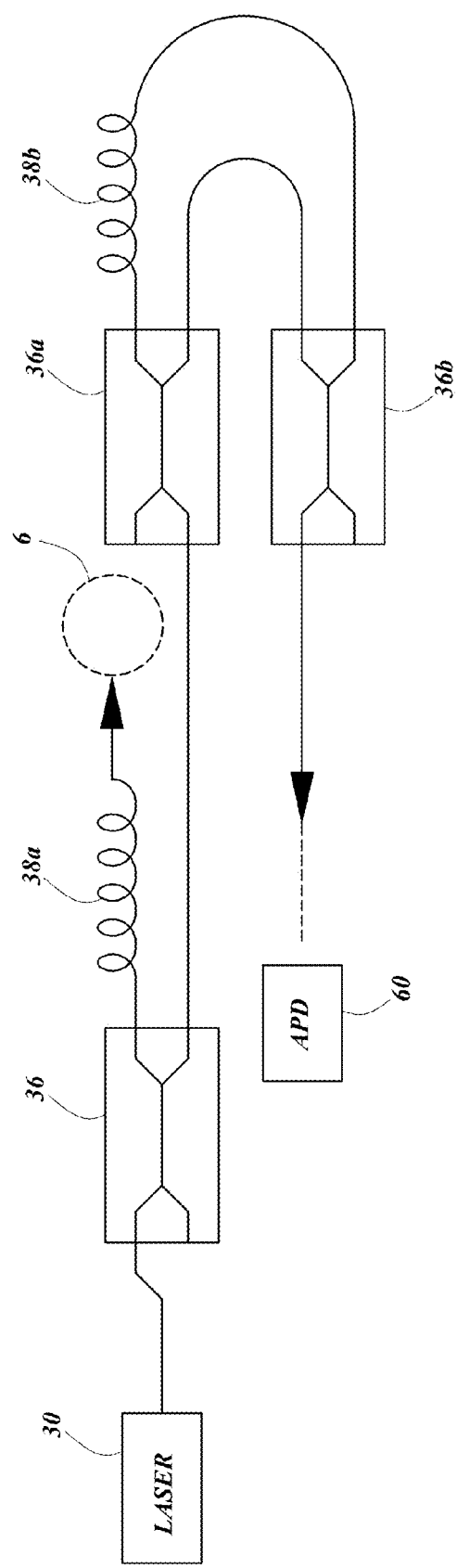
FIG. 10
FIG. 11

LIDAR SCANNER CALIBRATION

CROSS-REFERENCE TO RELATED APPLICATIONS

This application is the U.S. national phase entry under 35 U.S.C. §371 of PCT/US2014/066901, filed Nov. 21, 2014, which claims the priority benefit under 35 U.S.C. §119(e) to U.S. Provisional Patent Application Ser. No. 61/907,951 (filed Nov. 22, 2013) the entire disclosure of which is hereby incorporated by reference herein.

BACKGROUND OF THE INVENTIONS

Field of the Inventions

The present application relates to the field of metrology, and particularly to LiDAR (Light Distance And Ranging) sensors and related devices.

Description of the Related Art

The process for measuring distance and reflectance values for objects within an environment without touching those objects is of great interest to many industries including surveying, architecture, entertainment (character generated effects for movies and video games), construction, forensic and geography applications. Historically to collect accurate distance and reflectance measurements one used photogrammetry techniques, but the process for extracting information from stereo imagery is both time consuming and expensive. Over the past decade advances in Light Detecting and Ranging (LiDAR) technology have enabled practitioners to scan large area surfaces while collecting billions of data points, each with a precise latitude, longitude and elevation (x, y, z) values within the local (relative) coordinate system. The aggregate of the billions of data points is referred to as a point cloud data set. Practitioners will subsequently extract objects from the point cloud and then create three dimensional models. Those models are then used in numerous applications. For example within geographic information systems (GIS) industry, practitioners will frequently integrate Global Positioning System (GPS) data into the point cloud to 'geo-reference' it to a global coordinate system. Every data point in a geo-referenced point cloud has an absolute x, y, and z location on the earth's surface.

SUMMARY OF THE INVENTIONS

LiDAR, specifically time-of-flight based LiDAR, is a distance range measurement technique in which a brief laser pulse (e.g. approximately 1-10 nanoseconds pulse width) is emitted and the reflected light is detected while the time between the emitted pulse and reflected pulse is measured. This time of flight of the laser pulse from the time it is emitted until it is reflected back to the LiDAR instrument corresponds to the distance between the LiDAR sensor and the target surface.

The fraction of light reflected by a diffuse (non-shiny) surface is its reflectance. An estimate of the target surface's reflectance can be calculated from the ratio of reflected light received by the LiDAR sensor to the emitted light, given the measured distance to the target.

The direction of the light emitted by the laser can be scanned with a spinning mirror, allowing measurements through a range of angles. Thus, the distance to various objects can be measured over a range of angles.

Time to digital converters ("TDC") or time measurement units ("TMU") can be used to make precise time measurements between two electrical events (like pulse edges) and report that time in a digital electronic format. In some embodiments, a TDC chip can achieve a time measurement precision of 10 picoseconds. A TDC can be used to measure the time of flight of a laser pulse for LiDAR distance measurement. Accounting for the speed of light, a time measurement precision of approximately 10 picoseconds would correspond to a distance measurement precision of approximately 1.5 mm. White papers have been published describing the implementation of TDC designs in low cost field programmable gate array chips. While a dedicated TDC chip may cost over $200, a field programmable gate array chip may cost less than $40. *A 17ps Time-to-Digital Converter Implemented in 65 nm FPGA Technology*, by Claudio Favi and Edoardo Charbon, FPGA '09, Feb. 22-24, 2009, presents some examples of TDC chips that can be used in some embodiments, and is incorporated by reference herein.

In some embodiments, a LiDAR sensor can include a laser, a directional sensor, a window, an electromagnetic pulse receiving sensor, and a processor. The laser can be configured to emit a brief and narrow electromagnetic pulse. Further, the directional sensor can be configured to measure the direction of the brief and narrow electromagnetic pulse emitted by the laser. The brief and narrow emitted electromagnetic pulse can pass through the window. The pulse can then be reflected by at least the window and an object external from the LiDAR sensor, creating at least two reflected pulses. The electromagnetic pulse receiving sensor can be configured to measure the two reflected pulses resulting from the brief and narrow pulse emitted by the laser. The processor can be configured to receive information from the sensors, indicating a position of the object relative to the LiDAR sensor. Further, the processor can be configured to measure the intensity of the pulse being reflected by the window.

In a further embodiment, a method of accounting for an unclean or damaged window on a LiDAR sensor is provided. An electromagnetic pulse can be emitted through a window, and a reflection caused by said pulse from the window can be received. This reflected pulse can then have its intensity measured. Similarly, the emitted pulse can be reflected by an external object. Said object reflected pulse can also be received and have its time of receipt measured to indicate a distance from the external object.

In a further embodiment, a LiDAR sensor can include a laser, a directional sensor, an electromagnetic pulse receiving sensor, and a processor. The laser can be configured to emit a brief and narrow electromagnetic pulse. Further, the directional sensor can be configured to measure the direction of the brief and narrow electromagnetic pulse emitted by the laser. The pulse can be reflected by an object external from the LiDAR sensor to create a reflected pulse. The electromagnetic pulse receiving sensor can be configured to measure this reflected pulse. The processor can then be configured to determine a time of receipt of the reflected pulse according to an estimated time of a peak intensity of the pulse. The estimated time of the peak can be when a time derivative of the intensity of the reflected pulse declines below a threshold rate. This time of receipt can be indicative of a distance from the object.

In a further embodiment, a method of operating a LiDAR sensor is provided. An electromagnetic pulse can be emitted to cause a reflected electromagnetic pulse. The reflected pulse can be received and a signal indicative of a time derivative or slope of the intensity of the pulse can be produced. The signal indicative of the time derivative or slope can be compared with a reference slope, and a peak detected signal can be outputted when the signal indicative of the time derivative or slope passes the reference slope. The time of the peak detected signal can be measured to indicate a time of receipt of the reflected electromagnetic pulse from the object relative to, e.g., the time the initial pulse was emitted. Further, the time of receipt of the reflected electromagnetic pulse can indicate a distance from the object.

Photodetectors

LiDAR sensors typically use some form of optic to collect light reflected from target surfaces and focus this light onto a photodetector receiver for conversion to an electronic signal. Avalanche photodiodes are often a good choice for the photodetector because they convert incident photons to electrical current with a high gain or multiplication factor. This high gain enables detection of dark and/or distant target surfaces. In operation of the avalanche photodiodes, a reverse voltage or bias is applied across the avalanche photodiode so that the cathode is held positive relative to the anode. This applied bias causes incident photons to trigger impact ionization which is the gain mechanism in these devices.

The gain of an avalanche photodiode has a strong relationship to the applied bias and this relationship is affected by the temperature of the avalanche photodiode. Avalanche photodiodes can be operated in multiple modes. With moderate reverse bias applied, the avalanche photodiode is operated in a linear mode and current through the device is substantially linear with the rate of incident photons. At higher applied bias, the avalanche photodiode is operated in a Geiger mode and current through the device quickly increases in response to a single photon, without the need for additional photons. The transition between these modes can be smooth, but avalanche photodiode manufacturers refer to a breakdown voltage where the current through the device exceeds some fixed value in the absence of incident photons. Breakdown voltage can be used as an objective delineation for the upper limit of the linear mode. In linear mode operation, it can be beneficial to apply the bias voltage at a fixed small margin (for example, less than 3 Volts) below the breakdown voltage to achieve a high gain yet operate below the breakdown voltage where the output current begins to quickly grow irrespective of incident light. However, the gain of the avalanche photodiode can change with the temperature of the device as it does with the breakdown voltage. Thus, changes in temperature can cause an undesirable change in gain.

It can be advantageous for LiDAR sensors to keep their avalanche photodiode(s) operating with a constant gain. For example, LiDAR sensors can use the amplitude of the electric pulse provided by the avalanche photodiode to infer information about a target surface of an object, primarily related to the surface's reflectance. After processing, this amplitude can be used to help distinguish target objects with different reflectances. For example, lane markings and traffic signs can be distinguished from other objects based on their reflectance. Changes in gain can make it difficult to determine a true reflectance of an object because the resulting signal amplitude would be inconsistent. Furthermore objects at a long range or with a minimum reflectance might not be detected at all if the gain drops too far due to increased temperature. Finally, if the gain increases significantly, even near to or beyond that of the breakdown voltage, spurious noise current from the avalanche photodiode can cause false detection events.

In some embodiments, the avalanche photodiode can be operated with a constant gain by supplying a fixed bias voltage and holding the avalanche photodiode at a constant temperature. However, this can add cost and complexity to the sensor. Additionally such implementations can have difficulty performing under extreme ambient temperatures or when heat generated by the device itself is difficult to control. In other embodiments one can measure the temperature of the avalanche photodiode and adjust the applied bias voltage to compensate the temperature induced change of gain. This approach requires knowledge of the avalanche photodiode's gain relationship to temperature. If this relationship changes over the life of the sensor the effectiveness of this approach can be diminished. This approach also requires a good measurement of the temperature of the avalanche photodiode, but temperature sensing devices such as thermistors or thermocouples can be difficult to place onto or sufficiently close to the photodiode. It would be preferable to control the gain of an avalanche photodiode whose temperature varies without relying on measurements of its temperature.

In the embodiments described herein, a LiDAR sensor optionally can directly determine the avalanche photodiode's gain relationship to its bias voltage and enable its gain to be held constant. This can be done without measuring its temperature and without suspending the LiDAR sensor's range measurements.

In some embodiments, a LiDAR sensor can include a laser, a detector subsystem, an optical splitter, optics to project laser light to external targets as substantially parallel rays and focus rays reflected from external targets onto the detector, and a processor. The laser can be configured or controlled to emit brief pulses of light as rays. The optical splitter can be configured to receive a light pulse from the laser and split it into multiple pulses, directing at least one external pulse of the laser light out toward targets external to the sensor and directing at least one calibration pulse directly toward the detector. The output from the splitter for the external pulses can be positioned behind the optics so that their rays projected toward external targets can be made substantially parallel by the optics. The output from the splitter for the calibration pulses can be directed toward the avalanche photodiode and be positioned sufficiently close to the avalanche photodiode so that optic considerations like focus or alignment can be ignored. The detector subsystem can include an avalanche photodiode and supporting electronic circuitry that can be configured to provide the bias voltage and amplify the signals from the avalanche photodiode. The processor can be configured to receive signals from the detector subsystem, measure the time from laser pulse emission to reflected pulse reception, convert this elapsed time of flight to target distance, and measure the strength of received pulse signals. Further, the processor can be configured to adjust the bias voltage according to the measured strength of the calibration pulses to compensate for temperature changes of the avalanche photodiode without measuring the temperature of the avalanche photodiode.

References herein to measuring the strength of a pulse from the avalanche photodiode can apply to any electronic technique for determining or estimating the amplitude or the integral of amplitude of the current pulse through the avalanche photodiode in response to a pulse of light. This pulse can take the form of any time varying current signal that is distinguishable from the quiescent current state of the avalanche photodiode, including whatever DC current and noise currents are present while a laser pulse is not being received. Such electronic techniques can include conversion of the current through the avalanche photodiode into a voltage signal to facilitate processing and measurement. Making computations from such pulse strength measurements and using these computations to control the bias voltage applied to the avalanche photodiode can include the use of various types of processors and interface circuits such as analog to digital converters whose digital interfaces are connected to an embedded processor, microcontroller, DSP, FPGA, or CPLD. Optionally, some embodiments may include interface circuits that provide peak holding of a voltage signal that can subsequently be sampled by an analog to digital converter with likewise connection to its digital interface.

According to a further feature, the optical splitter can be configured so that the calibration pulse directed toward the avalanche photodiode can be received by the avalanche photodiode before the pulse reflected by the nearest external target.

According to a further feature, the optical splitter can be configured to receive a light pulse from the laser and split it into three light pulses. One such pulse, referred to herein as the first calibration pulse, can be directed toward the avalanche photodiode along a minimum delay path. A second pulse, referred to as the second calibration pulse, can be directed toward the avalanche photodiode with an additional delay. The third pulse, the external pulse, can be directed out toward external targets after a yet longer delay. These delays can be configured to permit the measurement of each pulse's strength prior to the arrival of a subsequent pulse.

According to a further feature, the splitter can optionally comprise free-air optics such as one or more beam splitters. With such a splitter, the calibration pulse will naturally reach the avalanche photodiode before target reflected pulses due to the difference in free air path lengths. Additional delay can be added to, for example, the external pulse's path through the use of mirrors to extend its beam path after the beam splitter.

According to a further feature, the laser light pulses can optionally be directed within optical fiber. The optical splitter can include one or more fiber optic couplers. The delay functions of the optical splitter can be accomplished by passing the light pulses through various lengths of optical fiber. In the telecommunications industry and herein, fiber optic couplers are also referred to as fiber optic splitters because they provide both reciprocal functions.

In a further embodiment, a LiDAR can include a laser, an avalanche photodiode, a splitter, and a processor. The laser can be configured to emit a narrow electromagnetic pulse. The avalanche photodiode can be configured to receive one or more electromagnetic pulses and output a response signal in response to said pulses. The photodiode can also be positioned to receive at least one reflected pulse, reflected by an object external from the LiDAR sensor and caused by the laser. The avalanche photodiode can also have a bias voltage applied to it affecting the response signal. The splitter can be positioned to receive the narrow electromagnetic pulse and split it into at least one external pulse directed toward the object external from the LiDAR sensor and at least one calibration pulse directed toward the photodiode. The calibration pulse directed toward the photodiode can be received by the photodiode before the pulse reflected by the object. The processor can be configured to receive response signals from the photodiode. Further, the processor can be configured to adjust the bias voltage according to a response signal caused by the calibration pulse to compensate for temperature changes of the photodiode.

In a further embodiment, a method of measuring a reflected electromagnetic pulse is provided. An electromagnetic pulse can be emitted, and split into at least an external pulse and a calibration pulse. The calibration pulse can be directed toward an avalanche photodiode and the external pulse can be directed toward an object to be measured (causing a reflected pulse from the object). An initial bias voltage can be applied to the photodiode and the photodiode can receive the calibration pulse while under the initial bias voltage. The response from the photodiode caused by the calibration pulse can be measured and used to apply a desired bias voltage to the photodiode to adjust for temperature changes of the photodiode. The photodiode can also receive the reflected pulse and a response caused by it can be measured.

In a further embodiment, a LiDAR sensor can include a laser, an avalanche photodiode, and a splitter. The laser can be configured to emit a narrow electromagnetic pulse. The avalanche photodiode can be configured to receive one or more electromagnetic pulses and output a response signal in response to said pulses. Further, the photodiode can be positioned to receive at least one reflected pulse being reflected by an object external from the LiDAR sensor caused by the laser. The avalanche photodiode can also have a bias voltage affecting the response signal. The splitter can be positioned to receive the narrow electromagnetic pulse and split it into at least one external pulse directed toward the object external from the LiDAR sensor and at least one calibration pulse directed toward the photodiode. The calibration pulse directed toward the photodiode can be received by the photodiode before the pulse reflected by the object. The LiDAR sensor can also include a means for adjusting the bias voltage to account for temperature variations without measuring temperature.

BRIEF DESCRIPTION OF THE DRAWINGS

These and other features, aspects, and advantages of the inventions disclosed herein are described below with reference to the drawings of preferred embodiments, which are intended to illustrate and not to limit the inventions. Additionally, from figure to figure, the same reference numerals have been used to designate the same components of an illustrated embodiment. The following is a brief description of each of the drawings.

FIG. 8 depicts an embodiment method for recording a time and peak intensity of a pulse.

FIG. 9 depicts an embodiment method for alerting a user of an unclean or damaged window.

FIG. 10 depicts an embodiment LiDAR sensor including an optical splitter that splits an emitted laser pulse into one calibration pulse and one external pulse.

FIG. 11 depicts an embodiment LiDAR sensor including an optical splitter that splits an emitted laser pulse into two calibration pulses and one external pulse.

DETAILED DESCRIPTION OF THE PREFERRED EMBODIMENTS

Figure 1:
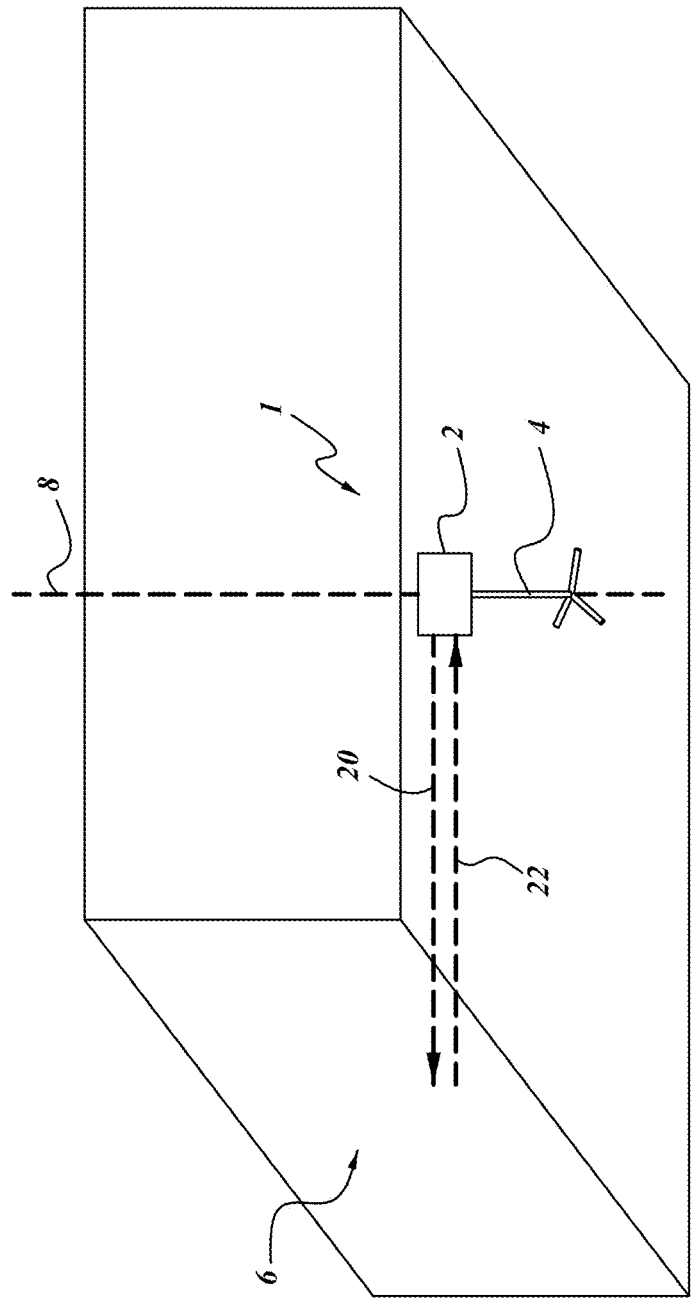
FIG. 1 depicts an embodiment position sensing device.

FIG. 1 depicts an embodiment position sensing device 1. The position sensing device is shown in an arbitrary environment, depicted as a walled room. However, it will be understood that the position sensing device 1 can be used in other environments such as a construction site, a mine, a laboratory, or other indoor and outdoor environments. The position sensing device 1 can be configured to measure at least one point, or further at least one spatial map of a portion of the environment, such as an object 6 in the room. For example, in the context of the room, the object 6 measured by the position sensing device 1 can be one or more walls of the room. In some embodiments the position sensing device 1 can measure a particular set of separate and discrete points, whereas in further embodiments the position sensing device 1 can measure a continuous span of points, as will be described further below. The measurement can be made using a brief and narrow electromagnetic pulse 20 (further described below), such as a light pulse. For example, the pulse 20 can be electromagnetic energy between ultraviolet and far infra-red. Further, the pulse can have a wavelength between 10 nm and 1 mm. However, it will be understood that other mechanisms can be used, such as other pulses along the electromagnetic spectrum and other forms of directional energy. The pulse 20 can be reflected by the object 6 to form an object reflected pulse 22, which can be used by the sensor 2 to determine a position of the object 6 according to a time of arrival of the reflected pulse 22 relative to the time of the initial pulse 20.

As further shown, the position sensing device 1 can include a sensor 2 mounted on a base 4. The base 4 is depicted as a tripod. In many embodiments, it will be desirable to use a base 4 that is substantially stable, as movement of the positioning device 1 during operation can add error to measurements provided by the position sensing device 1. In other embodiments the sensor 2 can be mounted on other objects, such as a vehicle (e.g., car, plane, bicycle), human-carried object (e.g., on a helmet, backpack, or handle), or the like. Further, it will be understood that the sensor 2 can be usable separate from the base 4 or another mount. For example, some embodiments of the sensor 2 can include a flat bottom such that it can be placed directly on the ground, a table, or another surface. Further embodiments of the sensor 2 can be configured to be held directly by a user.

As noted above, the sensor 2 can be configured to measure a continuous span of points. In some embodiments, this can be best described as an angular span relative to the sensor 2. For example, in some embodiments the sensor 2 can have rotatable elements, such that it can sequentially take measurements over a span of angles. In some embodiments, this span of angles can be defined by a rotation about a single primary axis of rotation 8. As shown in FIG. 1, the axis of rotation 8 can be substantially vertical and aligned with the base 4. The sensor 2 can be configured to rotate about this axis of rotation 8, measuring the distance to one or more objects 6 along the angular span. In further embodiments, the sensor 2 can also measure in angular spans rotating vertically, outside a plane perpendicular to the axis of rotation 8. In embodiments where the sensor 2 can measure along angular spans in both directions, the sensor 2 will potentially be able to measure substantially all objects 6 in its environment, measuring at substantially every combination of angles. However, it will be understood that the angular spans measurable by the sensor 2 may be limited by certain components of the sensor itself which may create blindspots. Nevertheless, in such embodiments substantially all of the environment can still be measured by the sensor 2.

Figure 2:
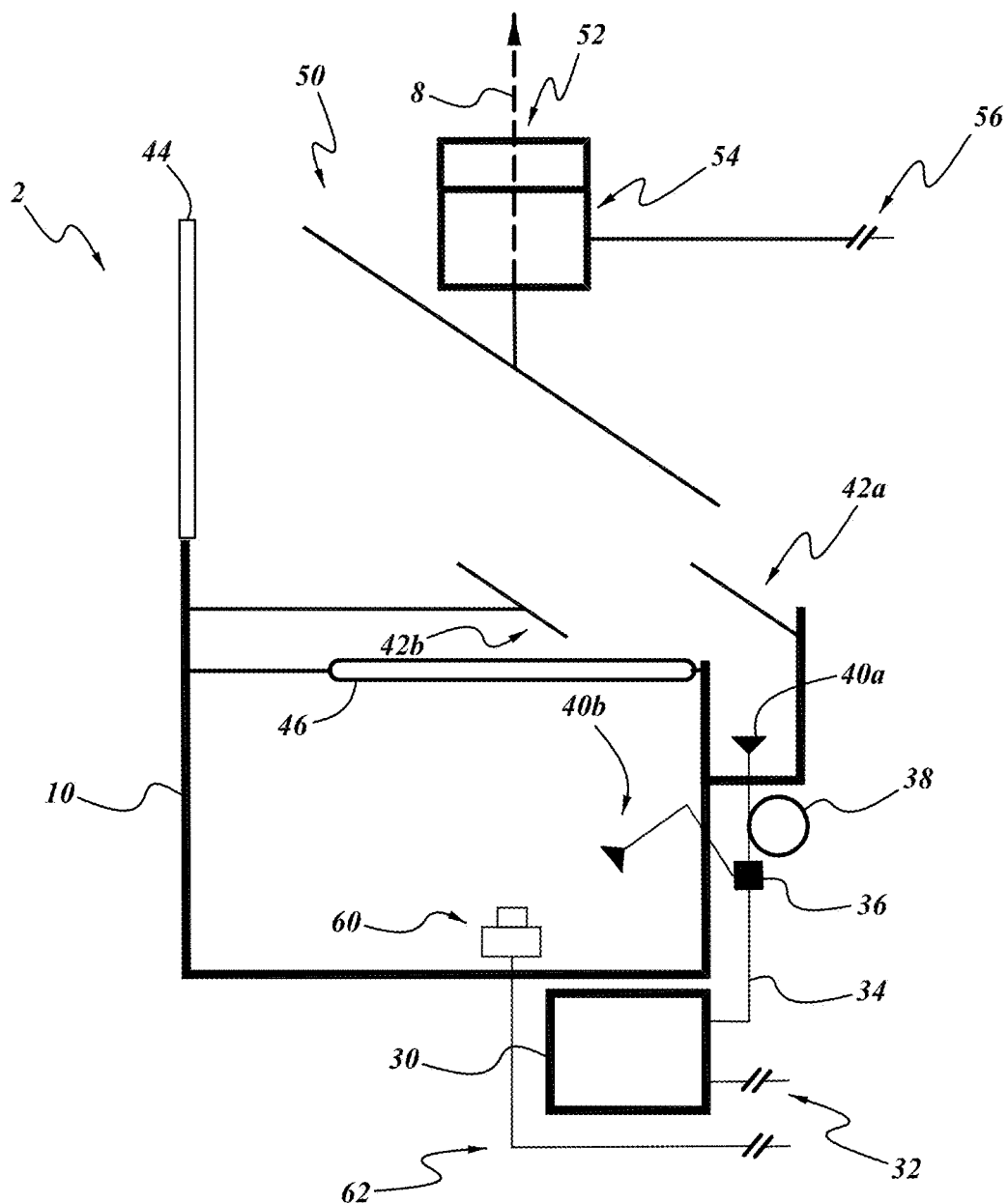
FIG. 2 depicts an embodiment LiDAR sensor usable with a position sensing device.

FIG. 2 depicts an embodiment of a sensor 2 configured to measure position. The sensor 2 is depicted as including a housing 10 that can hold a variety of the components of the sensor. For example, a fiber laser 30 can be mounted to the housing 10, e.g., at a bottom portion. The fiber laser 30 can be configured to emit a laser beam, although a wide variety of other forms of energy can be used (as discussed above). The laser beam can be emitted from the fiber laser 30 as a substantially short and discrete pulse of energy. Power for the fiber laser 30 can be provided by a power and communication cable 32. This cable can additionally provide communication with the fiber laser 30, and thus can control the timing and form of pulses emitted by the fiber laser 30. Notably, other types of lasers can be used other than fiber lasers. For example, a diode laser or a q-switched laser could also be used, and their emitted electromagnetic energy can be coupled into optical fiber.

In some embodiments, the emitted pulse from the fiber laser 30 can proceed directly out of the sensor 2, and into the external environment toward the measured object 6. However, in other embodiments it may be desirable to redirect and/or reform the emitted pulse within the sensor 2 to allow greater flexibility in functionality and packaging of components in the sensor 2. For example, in the depicted embodiment, the emitted pulse from the fiber laser 30 is redirected and split prior to exiting the sensor 2.

Referring to FIG. 2, in some embodiments, the light pulse emitted from the laser 30 can be coupled into a fiber optic cable 34. The laser can be a variety of types of laser, such as a fiber laser in which the amplification occurs within optical fiber and whose output is naturally transmitted in an optical fiber, or a solid state laser such as a laser diode that is optically coupled into a fiber optic cable.

Figure 7:
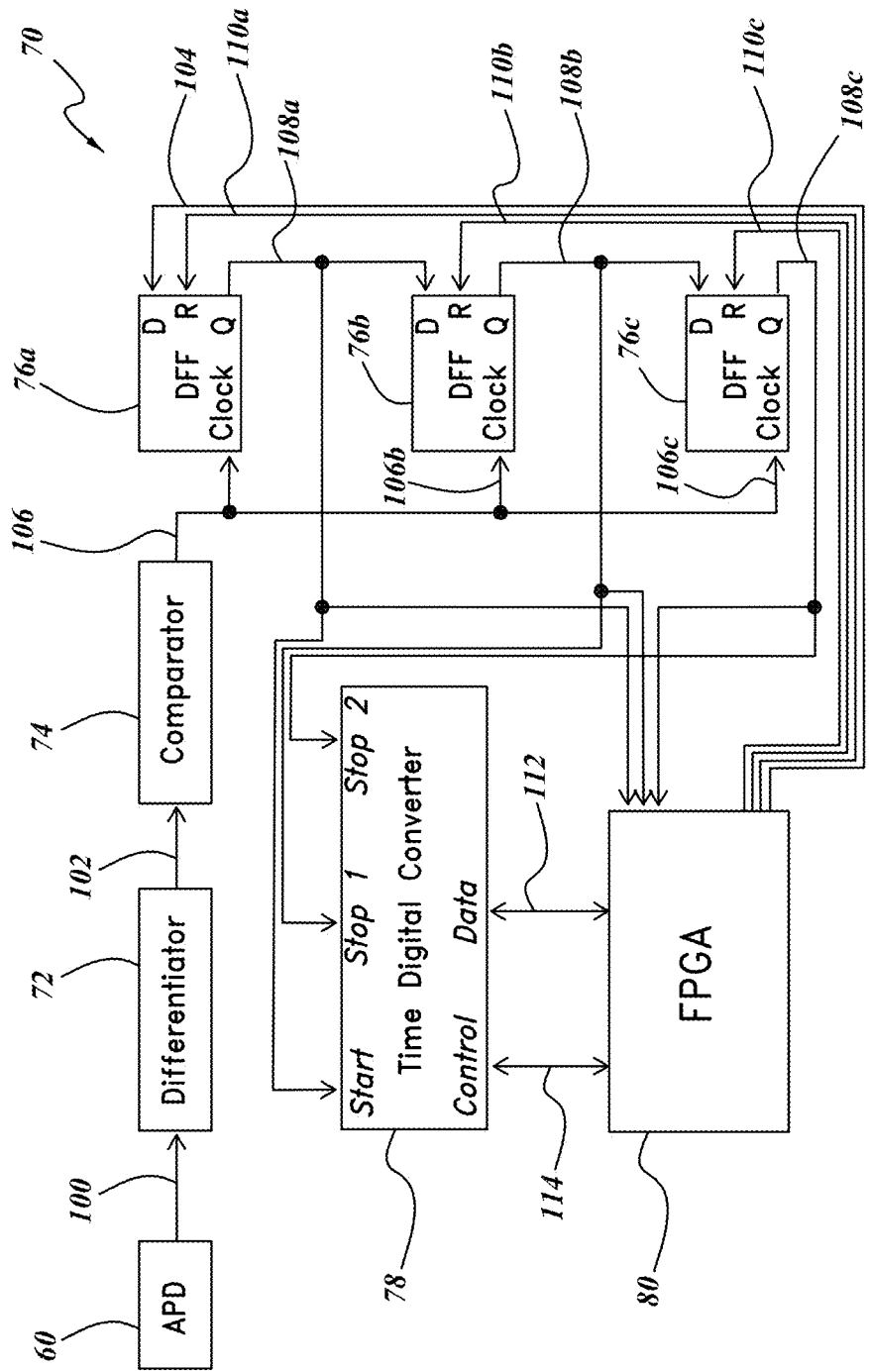
FIG. 7 depicts embodiment electronics associated with the LiDAR sensor of FIG. 2.

As shown in FIG. 2, the laser 30 outputs the emitted pulse to the fiber optic cable 34, which redirects the emitted pulse. The emitted pulse can then enter a fiber optic splitter 36. The fiber optic splitter 36 can separate the emitted pulse into a plurality of separate pulses each having a controllable portion of the intensity of the emitted pulse. In the present embodiment, the pulse can be split into two separate pulses and a delay path 38, such as a fiber cable delay loop, can be introduced to ensure the external pulse does not leave the sensor 2 until the calibration pulse can be received by a pulse receiving sensor 60. The pulse receiving sensor 60 can be configured to produce a signal upon receiving the calibration pulse 24. For example, in some embodiments the pulse receiving sensor 60 can be a photoelectric transducer, such as an avalanche photodiode ("APD") as shown in FIG. 7. Further, in some embodiments the output from the pulse receiving sensor 60 can be amplified, such as with a transimpedance amplifier. However, it will be understood that other pulse receiving sensors 60 can be used, such as a photomultiplier tube or other types of photodiodes. Output from the pulse receiving sensor 60 can be processed, as further described below.

Figure 3:
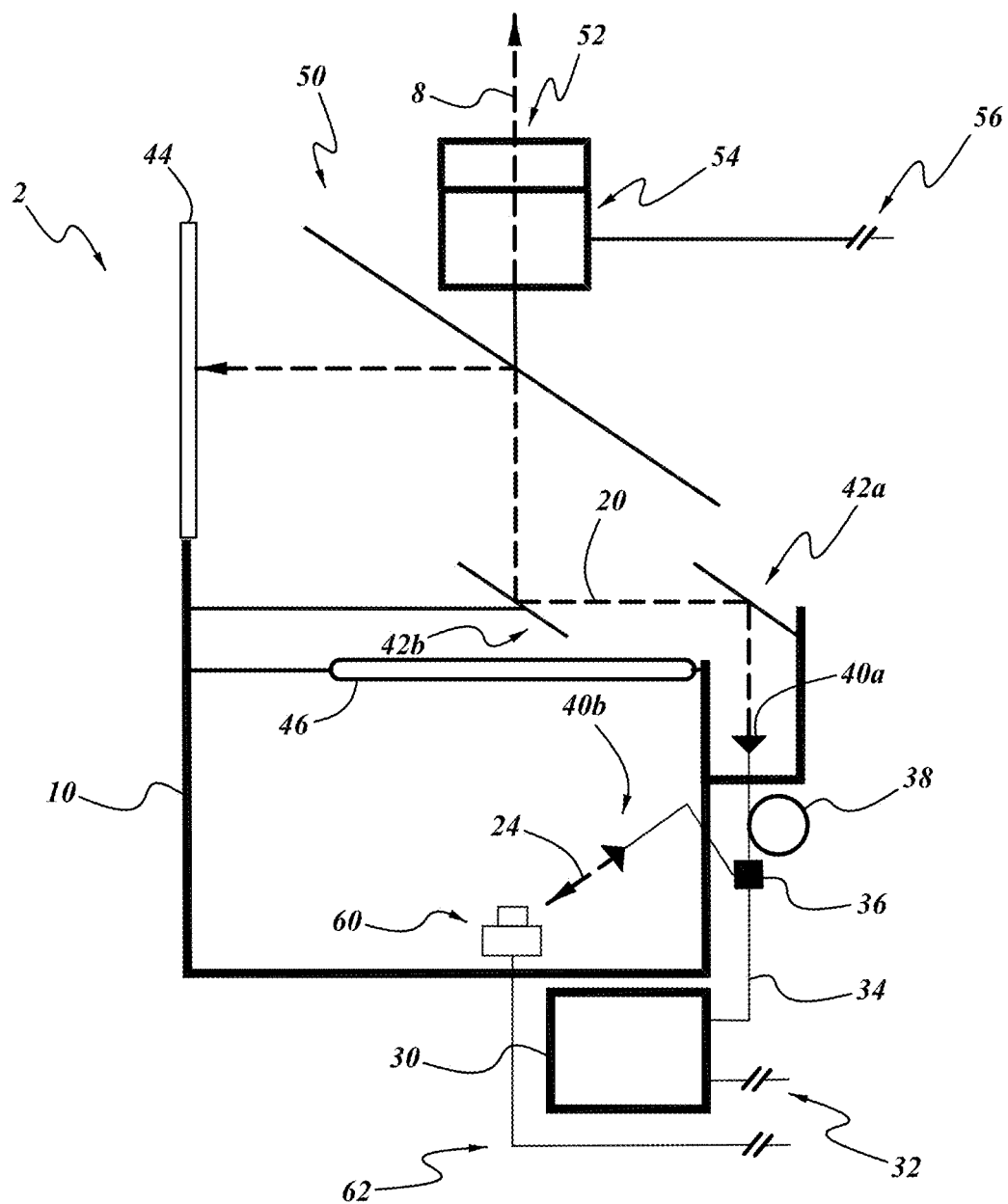
FIG. 3 depicts the LiDAR sensor of FIG. 2, with an emitted pulse.

As shown in FIG. 3, one portion of the emitted pulse from the fiber laser 30 can be a calibration pulse 24. The calibration pulse 24 can be directed from the fiber optic splitter 36 to the avalanche photodiode 60. In some embodiments, the calibration pulse can additionally be concentrated toward the avalanche photodiode 60, such as with a lens 40B, such as a collimator lens that can straighten the beam.

In some embodiments, the fiber optic splitter 36 can be configured to make the calibration pulse 24 much smaller than the output pulse 20. For example, in some embodiments the calibration pulse 24 can be approximately 1% of the emitted pulse and the output pulse 20 can be approximately 99% of the emitted pulse. Splitters in this ratio are commonly available fiber optic components. In other embodiments, the calibration pulse 24 can be made much smaller, such as no more than 0.01% of the laser pulse. The calibration pulse 24 can be emitted very near the avalanche photodiode 60 and it only needs to stimulate a moderate strength signal from the avalanche photodiode 60, and thus the strength of the calibration pulse can be substantially small.

In some embodiments an optical filter can be placed into the path of the calibration pulse to further reduce the strength of the calibration pulse after the fiber optic splitter. This filter may be employed to prevent saturation of circuitry measuring the pulse strength. Thus, if the fiber optic splitter does not reduce the calibration pulse strength sufficiently to prevent saturation, a filter can also be used to further reduce its strength.

As further shown in FIG. 3, a second portion of the emitted pulse from the fiber laser 30 can be an output pulse 20. The output pulse 20 can be directed from the fiber optic splitter 36 to the external environment using one or more elements to redirect, reform, and delay the external pulse as desired. For example, in the depicted embodiment the output pulse 20 can first pass through a fiber cable delay loop 38. The fiber cable delay loop 38 can include a wound length of fiber cable forming an extended path for the pulse 20 to travel through. This can advantageously extend the travel time of the output pulse 20. This extended travel time can advantageously provide a delay between the calibration pulse 24 and a window reflected pulse 26, and an object reflected pulse 22 (further described below). This extended time between pulses can permit the detection and measurement of the calibration pulse before a window or object reflected pulse is received. In some embodiments the length of the delay can be extended further to permit a change in the bias voltage applied to the avalanche photodiode before the target reflected pulse 22 is received.

After the fiber cable delay loop 38, the output pulse 20 can pass through a main collimator lens 40A configured to straighten the output pulse into a narrow beam. From the collimator lens 40A, the output pulse can then be redirected by a series of mirrors. As shown, the output pulse 20 can be initially directed vertically until it is reflected from a first fixed mirror 42A. The fixed mirror 42A can redirect the output pulse 20 horizontally, toward a second fixed mirror 42B. The second fixed mirror 42B can then redirect the output pulse 20 back vertically, toward a spinning mirror 50.

The spinning mirror 50 can be configured to redirect the output pulse 20 toward an exterior window 44. The output pulse 20 can then proceed through the window 44 to an external environment and be reflected, as further described below. The spinning mirror can be connected to a mirror motor 54 configured to spin the mirror 50 about a primary axis of rotation 8. Spinning the mirror 50 can then cause the output pulse 20 to rotate about the primary axis of rotation 8. Advantageously, the exterior window 44 can be substantially circular, such that the output pulse 20 can pass through the window as the spinning mirror 50 redirects the output pulse at different angles. As shown, the output pulse 20 can be redirected about the horizontal plane, relative to the sensing device 1. Thus, the output pulse 20 can allow measurement by the sensor 2 along a 360 degree arc about the position sensing device 1. In further embodiments the spinning mirror 50 can be configured to rotate about a secondary axis, allowing the output pulse 20 to be directed vertically relative to the sensing device 1, allowing the sensor 2 to measure in substantially all directions.

The spinning mirror 50 can additionally include an angular sensor such as an encoder 52. The angular sensor 52 can measure an angular position of the spinning mirror 50 (e.g., by measuring the position of the motor 54). This angular position can be outputted by the angular sensor 52, to indicate the angular position of a measurement provided by the output pulse 20, as further discussed below. The output from the sensor 52 can be provided along a mirror motor and communication cable 56. The cable can additionally provide power and control to the mirror motor 54, e.g. from a processor 70.

Figure 4:
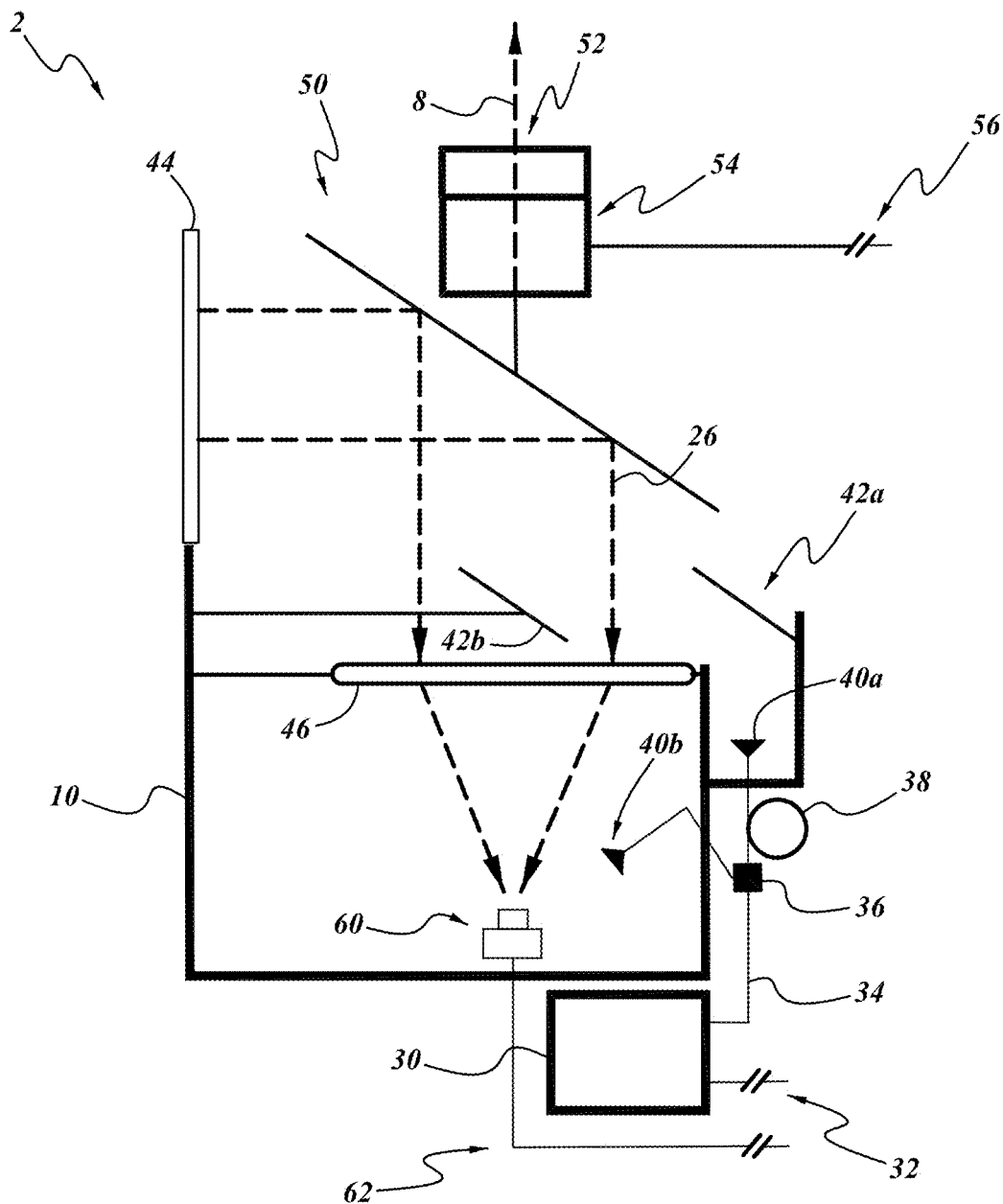
FIG. 4 depicts the LiDAR sensor of FIG. 3, with a first reflected pulse.
Figure 6:
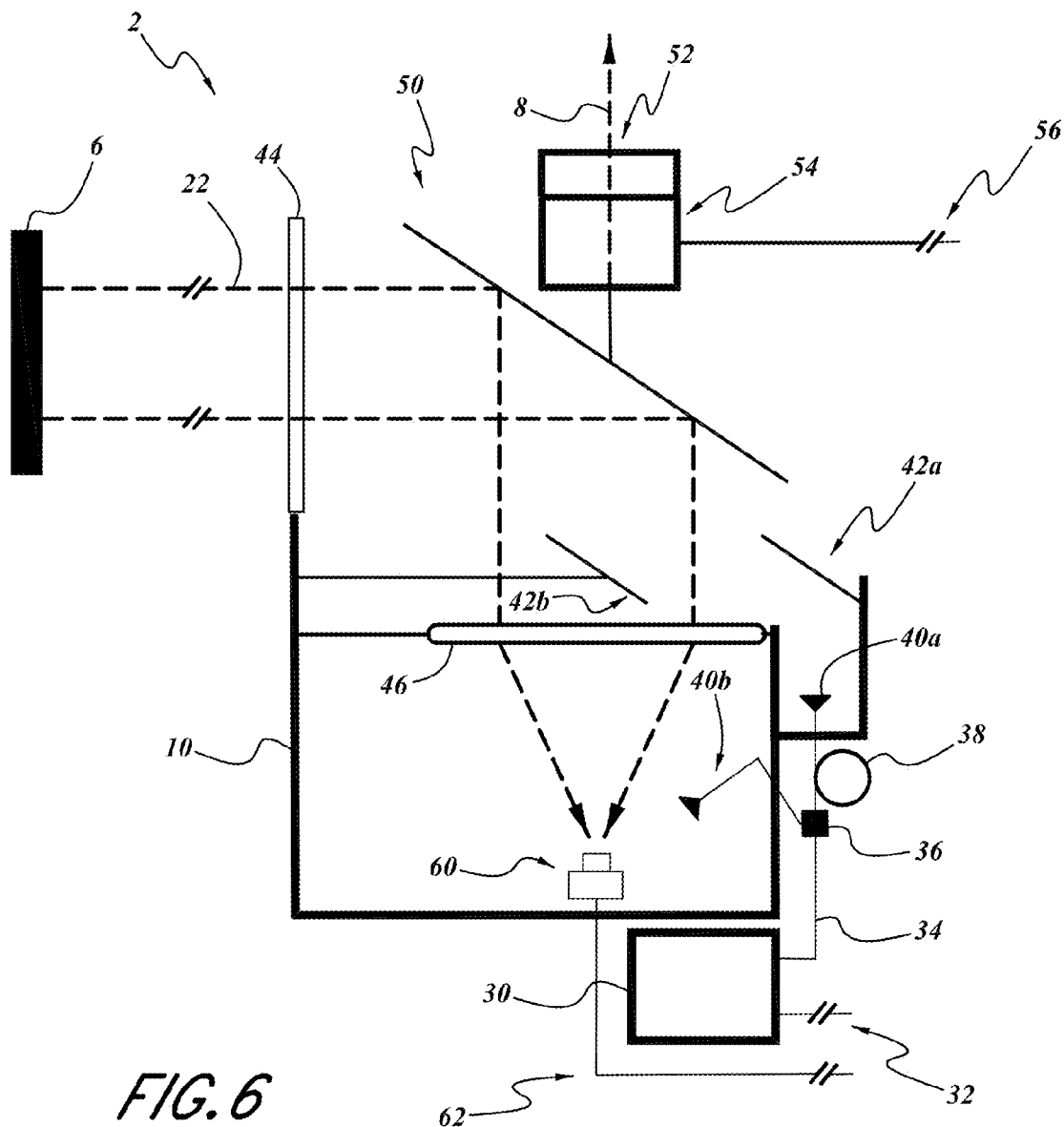
FIG. 6 depicts the LiDAR sensor of FIG. 2, with a second reflected pulse.

As will be further described below, reflected pulses 22, 26 caused by the output pulse 20 are depicted in FIGS. 4 and 6. The reflected pulses 22, 26 can return through or from the window 44 toward the spinning mirror 50. The spinning mirror 50 can then redirect the reflected pulses 22, 26 downward, toward the pulse receiving sensor 60. In some embodiments, the spinning mirror 50 can be substantially larger than the second fixed mirror 42B. Further, as shown, the fixed mirror 42B can be positioned between the spinning mirror 50 and the pulse receiving sensor 60. It will be understood that the width of the pulses 20, 22, 26 can gradually expand during their time of flight, such that the reflected pulses 22, 26 can be broader than the output pulse 20. In the depicted embodiment, the reflected pulses 22, 26 can be sufficiently broad such that a sufficient proportion of the reflected pulses are not shaded by the narrower second fixed mirror 42B. An optical lens 46 can be positioned between the spinning mirror 50 and the pulse receiving sensor 60 to focus the broader reflected pulses 22, 26 toward the sensor. The sensor can then output a signal in response to these reflected pulses 22, 26 (or the calibration pulse 24) along a cable 62.

The process of measuring position is now described in reference to FIGS. 2-9. As depicted in FIG. 2 and further described above, the fiber laser 30 can emit a pulse upon instructions provided through the associated power and communication cable 32. In some embodiments, the power and communication cable 32 can be communicatively linked to a processor, such as the processor 70 depicted schematically in FIG. 7. The processor 70 can be configured to control the fiber laser 30 to control the time and nature of the emitted pulse.

In some embodiments, the processor 70 can be one or more electrical components on a general purpose computer, which can be operatively connected to the position sensing device 1 (e.g., with a wired or wireless connection). In other embodiments the processor 70 can be one or more electrical components provided on the position sensing device (e.g., on the sensor 2, within the sensor housing 10). Further, in some embodiments the processor 70 can include the one or more electrical components on one or more printed circuit boards. It will be understood that the processor 70 can be configured to provide additional functionality beyond that explicitly described herein.

As shown in FIG. 2 and discussed above, the emitted pulse can be split by the fiber optic splitter 36 into two separate pulses: a calibration pulse 24 and an output pulse 20. The calibration pulse 24 can be transmitted substantially directly to the avalanche photodiode 60. The calibration pulse 24 can thus arrive at the avalanche photodiode 60 first, providing a reference time indicative of the time that the pulse from the fiber laser 30 was initially emitted. The LiDAR sensor's time of flight measurement can be the elapsed time between receipt of this calibration pulse 24 and receipt of the object reflected pulse 22.

In further embodiments, two calibration pulses can be generated by the fiber optic splitter 36, either pulse could be used to indicate the time that the pulse from the fiber laser was initially emitted. Indeed, both calibration pulses can have fixed delays from the fiber laser pulse emission and the times that both calibration pulses are detected can be averaged to reduce the jitter or uncertainty in the time of flight measurement.

Also discussed above, in some embodiments, the fiber cable splitter 36 can be configured to make the calibration pulse 24 much smaller than the output pulse 20. For example, in some embodiments the calibration pulse 24 can be approximately 1% of the emitted pulse and the output pulse 20 can be approximately 99% of the emitted pulse. In other embodiments, the calibration pulse 24 can be made approximately only as large a proportion of the emitted pulse as is necessary to reliably be detected by the pulse receiving sensor 60 and the associated components, as discussed herein.

As shown in FIG. 7, the pulse receiving sensor 60 can output a signal 100 upon receiving the calibration pulse 24. In some embodiments the signal 100 from the sensor 60 can be an analog electrical signal, such as the output from a photodiode. However, in other embodiments the signal can take other forms, such as a digital signal. This reception of the calibration pulse 24 can be represented as block 200, as depicted in FIG. 8.

The signal 100 from the pulse receiving sensor 60 can be received by a differentiator 72. The differentiator 72 can be an analog differentiator circuit, configured to output a time derivative of the signal 100 from the pulse receiving sensor 60. This signal 100 can have an intensity (e.g., amplitude, voltage, etc.) that can be indicative of the intensity of the received calibration pulse 24. Thus, the output of the differentiator 72 can indicate a time derivate of the intensity of the calibration pulse 24. This production of a signal indicating a time derivative (or slope) of the intensity of the calibration pulse 24 can be represented as block 202, as depicted in FIG. 8.

The output of the differentiator 72 can be a slope signal 102 that, like the other signals described herein, can be an analog signal, a digital signal, an electrical signal, or the like. The slope signal 102 can be received by a comparator 74. The comparator 74 can be a comparator circuit such as an analog comparator circuit. In some embodiments, the comparator 74 can be configured to output a high intensity signal when the input (e.g., the slope signal 102) descends below a reference intensity (corresponding to a reference slope). As discussed above, the intensity of the slope signal 102 can be indicative of a time derivative of the intensity of the calibration pulse 24. Thus, the comparator 74 can output a high intensity signal when the time derivative of the intensity of the calibration pulse 24 falls below a certain value, such as the reference intensity (corresponding to a reference slope).

In some embodiments, the comparator 74 can be set to output a high intensity signal when the time derivative of the intensity of the calibration pulse 24 indicates that a peak or maximum intensity of the calibration pulse 24 has been reached. For example, the comparator 74 can indicate when the time derivative reaches approximately zero, indicating a possible peak. In other embodiments, the comparator 74 can indicate when the time derivative falls slightly below zero, preventing some noise in the signal from indicating a false peak when the intensity is actually still rising. The analysis of whether these conditions have been met (e.g., if the reference intensity has been met) can be represented as block 204, as depicted in FIG. 8. If the reference intensity is not met, the slope can continue to be output by the differentiator 72 and processed by the comparator 74.

Thus, the combination of the differentiator 72 and the comparator 74 can combine to form an element (e.g., an entirely analog circuit) able to output a signal indicative of the time of maximum or peak intensity of the calibration pulse 24. This time of maximum or peak intensity can define a time of arrival of the pulse. In other embodiments, alternative elements can be used to identify a time of arrival of the pulse. For example, in some embodiments a processing unit can measure an entire waveform of the pulse and compute a particular time (e.g., a peak time) by analyzing the complete wave form of the pulse. However, these elements may be more expensive than those used in other embodiments. As another alternative, the time of arrival of the pulse can be identified by measuring when an intensity of the pulse passes a particular threshold value. If the threshold value is reached during the pulse, the pulse will initially rise past the threshold value and then descend back past the threshold value. A peak time can then be calculated as a time between the two times the threshold value was passed. However, these elements might miss low intensity pulses that do not reach the threshold value. It will also be understood that any of these methods of analysis can be used with other electrical components. For example, in some embodiments a general purpose computer can compute a slope and compare it to a reference intensity in a similar manner.

The time and peak intensity of the calibration pulse 24 can then be recorded, as described below, and represented in block 206 of FIG. 8. The outputted signal indicative of the time of arrival of the calibration pulse 24 can be a first peak detect signal 106A. In some embodiments, the first peak detect signal 106A can be directly sent to an electronic timing module configured to record a time of arrival of the calibration pulse 24. However, in the depicted embodiment the time of arrival can be provided indirectly. As shown in FIG. 7, the first peak detect signal 106A can be provided to a first signal D-type flip flop ("DFF") 76A. FIG. 7 additionally indicates that the first peak detect signal 106A may also be provided to second and third DFFs 76B, 76C. However, the processor 70 can be configured such that the first peak detect signal 106A does not activate the second and third DFFs 76B, 76C, as will be further described below.

The first DFF 76A can additionally receive a first pulse enable signal 104. The first pulse enable signal 104 can act as a D-input to the first DFF 76A and the first peak detect signal 106A can act as a clock input. The first pulse enable signal 104 can be provided from a sub-level processor 80, such as a field-programmable gate array ("FPGA"), configured to enable the first DFF 76A at a desired time. For example, in some embodiments the first DFF 76A will be enabled only upon emission by the fiber laser 30 (which can also be controlled by the sub-level processor 80, via the fiber laser's power and communication cable 32, connection not shown in FIG. 7). Thus, exogenous pulses received by the sensor 2 can be ignored if not timed to coincide with an emitted pulse from the fiber laser 30.

Thus, when the first DFF 76A is enabled with a first pulse enable signal 104 at its D-input (e.g., by the sub-level processor 80), receipt of the first peak detect signal 106A at the clock input can cause the first DFF 76A to continuously output a first pulse detected signal 108A. Notably, this first pulse detected signal 108A can persist after the first peak detect signal 106A has dissipated. The first pulse detected signal 108A can be received by a time digital converter ("TDC") 78. In some embodiments, the TDC 78 can be configured to record time at a high accuracy (e.g., at sub-nanosecond resolution, at approximately 1 to 10 picosecond resolution, or at sub-picosecond resolution). Further, in some embodiments the TDC can use the first pulse detect signal 108A as a start signal, beginning the timing of a clock. As will be further described below, the TDC 78 can subsequently receive signals indicating the time of arrival of other pulses, and measure their time of arrival relative to the time of the start signal. Thus, the TDC 78 in the depicted embodiment can act as a relative clock, recording the time of each pulse relative to the time of the calibration pulse 24, as represented by the first pulse detected signal 108A. However, in other embodiments an absolute clock system can be used, wherein the time of the calibration pulse 24 can be recorded as an absolute time, and compared with the absolute times of the remaining pulses. Even further, in some embodiments no calibration pulse is used and the time of emission of the fiber laser 30 (e.g., as represented by a time the fiber laser is commanded to emit by the sub-level processor 80) can be used as a reference time similar to the calibration pulse 24.

The first pulse detected signal 108A can additionally be received at the D-input of the second DFF 76B, thus enabling the DFF 76B. The second DFF 76B can now measure the time of a window reflected pulse 26, depicted in FIG. 4. As shown in FIG. 4, the window reflected pulse 26 can be produced at the exterior window 44. The window 44 can be imperfectly transparent, such that not all of the output pulse 20 proceeds directly through the window. A portion of the output pulse 20 can be absorbed by the window 44, and further a portion of the output pulse can be reflected back by the window as a window reflected pulse 26.

Notably, the intensity of the window reflected pulse 26 can vary with the quality and condition of the window 44. For example, an unclean, scratched, dented, or otherwise degraded window 44 will usually have a higher intensity reflected pulse 26. Such degradations to the window 44 can also reduce the intensity of the object reflected pulse 22, which results from the output pulse 20 (which is reduced by the degradations on the window) and passes through the window on its return to the sensor 2 (reducing the intensity again). Thus, as further described below, the intensity of the window reflected pulse 26 can be used to calibrate measurements of intensity of the object reflected pulse 22 and further indicate a condition of the window 44 to a user.

The window reflected pulse 26 can reflect from the spinning mirror 50 and pass through the optical lens 46 to the pulse receiving sensor 60, as described above and depicted in FIG. 4. The time of arrival of the mirror reflected pulse 26 can then be represented in a manner similar to the time of arrival of the calibration pulse 24, as described above. Thus, a second peak detect signal 106B can be outputted by the comparator 74. Like the first peak detect signal 106A, the second peak detect signal 106B can be received by each of the DFFs 76. However, the first DFF 76A can already be activated, and thus can be substantially unaffected by the second peak detect signal 106B. Further, the third DFF 76C can be unenabled at its D-input, and thus also be unaffected by the second peak detect signal 106B. However, the second DFF 76B can be enabled at its D-input by the first pulse detected signal 108A. Thus, receiving the second peak detect signal 106B at the clock input of the second DFF 76B can cause the second DFF to continuously output a second pulse detected signal 108B.

The second pulse detected signal 108B can be received by the TDC 78. The TDC 78 can then output or record the time of the second pulse detected signal 108B. For example, the time can be a relative time, since the start signal provided by the first pulse detected signal 108A, as described above. Alternatively, the time can be an absolute time, as described above.

Figure 5:
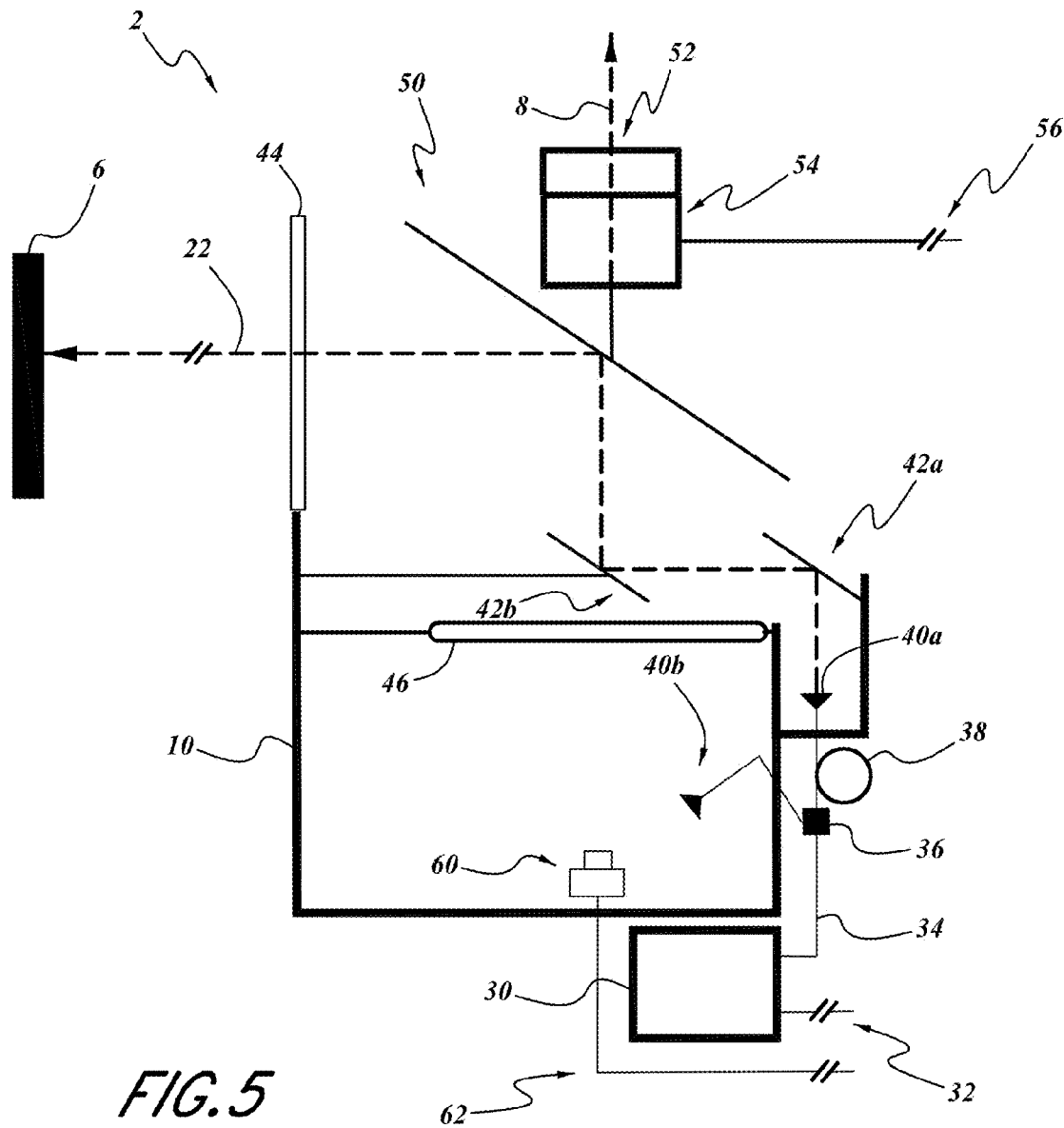
FIG. 5 depicts the LiDAR sensor of FIG. 2, with an extended emitted pulse.

The second pulse detected signal 108B can additionally be received at the D-input of the third DFF 76C, thus enabling the DFF 76C. The third DFF 76C can now be used to measure the time of an object reflected pulse 22, depicted in FIGS. 5 and 6. As shown in FIG. 5 and discussed above, a substantial portion of the output pulse 20 can proceed through the window 44 to an object 6. The object 6 can have a reflectance such that an object reflected pulse 22 returns to the sensor 2, through the window 44, as shown in FIG. 6. The object reflected pulse 22 can then reach the pulse receiving sensor 60 and produce a third peak detect signal 106C in a manner similar to that described above regarding the calibration pulse 24 and the window reflected pulse 26.

The third peak detect signal 106C can be received by each of the DFFs 76. However, the first and second DFFs 76A, 76B can be substantially unaffected because they are already activated. The third DFF 76C can be enabled by the second pulse detected signal 108B. Thus, the third peak detect signal 106C can cause the third DFF 76C to output a third pulse detected signal 108C. The third pulse detected signal 108C can be received by the TDC 78, which can record or output the time in a manner similar to that described above regarding the second pulse detected signal 108B (e.g., relative to the first pulse detected signal 108A, or an absolute time). In some embodiments, receipt of the third pulse detected signal 108C can cause the TDC to output its data and reset.

The data output by the TDC 78 can be indicative of a distance between the sensor 2 and the object 6. For example, the pulses 20, 22, 24, 26 can travel at a known speed (e.g., the speed of light). Thus, the time the pulse takes to reach the object and be reflected back (e.g., the time taken by the output pulse 20 and the object reflected pulse 22) can be proportional to the distance between the sensor 2 and the object 6. The time the calibration pulse 24 is received can provide an approximate reference start time for the output pulse 20, less a fixed time offset of at least the length of the fiber cable delay loop 38 divided by the speed of light in the fiber cable delay loop. In some embodiments, this time can be more reliable than a time when the fiber laser 30 is commanded to emit a pulse (which can also be recorded in some embodiments). The sensor 2 (e.g., the processor 70) can be further calibrated to account for any offset between the distance implied from the time of the calibration pulse 24 (as compared with the time of the object reflected pulse 22) and a true distance to the object 6. Similar operations can use the time of the window reflected pulse 26 to calibrate the sensor 2, which should be received at a consistent time after the calibration pulse 24.

In further embodiments, additional DFFs can be added, in a similar manner, to provide for more signals. For example, in some embodiments additional calibration pulses 24 might be used, such as in the embodiments described below in relation to FIGS. 10 and 11. Each DFF can signal the arrival of a different pulse, such that adding additional DFFs can provide for the receipt of additional pulses. Further, inputs to the TDC can be varied. For example, in some embodiments the time of receipt of the window reflected pulse 26 might not be measured, as its time should be substantially constant. Further, in some embodiments the TDC can be configured to measure the time of receipt of two object reflected pulses 22. Thus, the sensor 2 can detect when the output pulse 20 hits an edge of an object 6, and thus produces a reflection from said object edge and an additional object behind it. Thus, two distances can be measured with one output pulse 20. Further, the DFFs can signal the arrival of each pulse for purposes of measuring their amplitudes or peak intensities (as further described below), even if their time isn't measured by the TDC.

Advantageously, a sub-level processor 80, such as an FPGA, can provide additional functionality. For example, as shown, the sub-level processor 80 can receive each of the pulse detected signals 108. In some embodiments, the sub-level processor 80 can receive time data 112 from the TDC 78 upon receiving each of the pulse detected signals 108. In other embodiments, the sub-level processor 80 can be configured to receive time data 112 from the TDC 78 only upon receipt of the third pulse detected signal 108C. In further embodiments, the sub-level processor 80 can be configured to request time data 112 from the TDC 78 upon receipt of the third pulse detected signal 108C. Even further, in some embodiments the sub-level processor 80 can reset the TDC 78 with a TDC control signal 114 upon receipt of the third pulse detected signal 108C. Further, the sub-level processor 80 can provide pulse detected reset signals 110 to each of the DFFs 76, to reset the DFFs to a deactivated state so they can receive a new set of pulses. For example, an emitted pulse from the fiber laser 30 can be provided after the spinning mirror 50 is rotated to a new angle by the mirror motor 54.

As noted above, the sub-level processor 80 can additionally be communicatively connected to the fiber laser 30 via the power and communication cable 32. The sub-level processor 80 can thus control when the fiber laser 30 emits a pulse. In some embodiments, the sub-level processor 80 can enable the first DFF 76A when causing the fiber laser 30 to emit a pulse.

Further, the sub-level processor 80 can be communicatively connected to one or more peak measurement elements, such as a peak measurement circuit. The peak measurement elements can be communicatively connected to the pulse receiving sensor 60 to receive the signal from the sensor indicating the intensity of a received pulse. Upon receiving the signal, the peak measurement elements can store data representative of a peak intensity of the signal. Such peak intensity data can be used for a variety of purposes. For example, the peak intensity of the object reflected pulse 22 can indicate reflective properties of the object 6 such as its material, smoothness, shape, etc. In particular, the ratio of the peak intensity of the object reflected pulse 22 to the peak intensity of the calibration pulse 24 can be calibrated to provide an estimate of the surface reflectance of the object 6.

Further, this reflectance estimate can be corrected or improved using the window reflected pulse 26. As discussed above, imperfections on the window 44 can reduce the intensity of the object reflected pulse 22 when received by the pulse receiving sensor 60. The extent of these imperfections on the window 44 can be at least partially measured by measuring the intensity of the window reflected pulse 26. The measured intensity of the object reflected pulse (and the estimated reflectance of the object 6) can then be calibrated using the intensity of the window reflected pulse 26. For example, in some embodiments the estimated reflectance of the object 6, as measured by the intensity of the object reflected pulse 22, can be proportionally increased according to the intensity of the window reflected pulse 26.

Even further, as discussed above, the intensity of the window reflected pulse 26 can indicate the condition of the window 44. If the window 44 becomes overly unclean or damaged, the accuracy and reliability of the sensor 2 is diminished. In some embodiments, when a window reflected pulse 26 is received (block 250 in FIG. 9) the intensity of the peak of this pulse can be determined (block 252 in FIG. 9). The intensity of the peak can be compared with a threshold level or intensity (block 254 in FIG. 9). When the intensity of the window reflected pulse 26 reaches the threshold level, the sensor 2 can provide an alert to a user (block 256 of FIG. 9). The alert can come in a variety of forms, such as a visual display (LED light, text message on a monitor, etc.), an audible sound, or by flagging the output data as potentially inaccurate. This alert can then potentially prompt the user to inspect the window 44 and potentially clean or replace the window.

It will be understood that the strength of the calibration pulse 24 can provide diagnostic information. For example, if the intensity of the calibration pulse 24 drops below a threshold level, this can indicate problems with one or more internal components such as the laser 30, the fiber cable 34, the fiber light splitter 36, the avalanche photodiode 60, or the pulse strength measurement circuitry. Thus, the processor can be configured to monitor the strength of the calibration pulse 24 and indicate when an error condition is detected.

As noted above, the sub-level processor 80 can be communicatively connected to the one or more peak measurement elements. In some embodiments, two or more peak measurement elements can be provided. A first peak measurement element can initially be enabled by the sub-level processor 80 to receive a first impulse (e.g., the calibration impulse 24) and store its peak intensity. Upon receiving a first pulse detected signal (e.g., the first pulse detected signal 108A), the sub-level processor 80 can read the peak measurement intensity from the first peak measurement element and enable a second peak measurement element. The second peak measurement element can then receive and store a peak intensity of a second pulse (e.g., the window reflected pulse 26). The sub-level processor 80 can similarly read the peak measurement intensity from the second peak measurement element and reset and enable the first peak measurement element upon receiving a second pulse detected signal (e.g., the second pulse detected signal 108B). A similar process can be used to obtain the intensity of a third pulse (e.g., the object reflected pulse 22), upon receiving a third pulse detected signal.

Using two peak measurement elements in an alternating method, like the one described above, can advantageously allow a single triggering event to both read the data from one peak measurement element and reset/enable another peak measurement element. In some embodiments, using a single peak measurement element may require more complex control methods. Further, in some embodiments the pulses can be received with very little time between each pulse. Thus, it may be difficult to reset and read a single peak measurement element fast enough to ensure it is ready in time to receive a subsequent pulse. In further embodiments, the pulses may arrive too quickly for any of the peak measurement elements to reset/enable before the next pulse must be measured. Thus, in some embodiments a peak measurement element can be provided for every anticipated pulse to be received for a given output pulse 20. In even further embodiments, it may be necessary to provide sufficient peak measurement elements for more than one output pulse 20.

Further, as noted above, the sub-level processor 80 can be communicatively connected to the mirror motor 54 and the angular sensor 52, through the mirror motor & communication cable 56. The sub-level processor 80 can then receive data indicative of the angle of the spinning mirror 50 and control said angle using the motor 54. The sub-level processor 80 can thus cause the spinning mirror 50 to rotate through a span of angles, as described above. Further, the sub-level processor 80 can combine an estimated distance from the timing of the pulses 22, 24, 26 with the measured angle to define a relative position of the measured object 6 relative to the sensor 2.

The processor 70 can further be put in communication with an external computing device (e.g., with a wired or wireless connection). In some embodiments, the processor 70 can then be configured to output the measured data to the external computing device. In some embodiments, the output data can be the raw data received (e.g., the time and intensity of each pulse and the corresponding angle of the spinning mirror). In other embodiments, the output data can be processed data, such as an estimated position and reflectance of the object(s) 6 at a variety of angles. In further embodiments, the processor 70 can receive operating instructions from the external computing device that can optionally be used to control the sensor 2.

Figure 12:
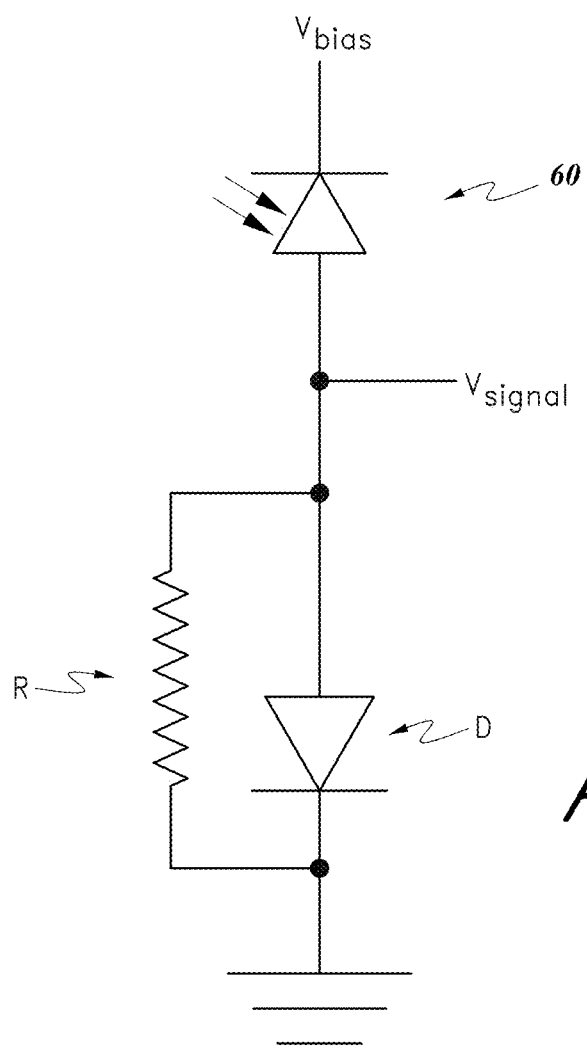
FIG. 12 depicts a circuit diagram including an avalanche photodiode for use in a LiDAR sensor.

FIGS. 10-12 depict further LiDAR sensor embodiments in which calibration pulses (such as the calibration pulse 24) can be used to calibrate the sensitivity of the pulse receiving sensor 60. As discussed above, in some embodiments the pulse receiving sensor 60 can include a photodiode such as an avalanche photodiode. Notably, the amplitude or strength of the signal from the photodiode can depend on the intensity or strength of the electromagnetic pulse received by the photodiode. Further, the strength of the signal from an avalanche photodiode can have significant nonlinear response characteristics. More specifically, the strength of a response from the photodiode can eventually grow exponentially, particularly when a breakdown level is reached. However, very low strength pulse may be below a threshold necessary to be detected by the photodiode.

For LiDAR sensors, it is desirable that the threshold level be sufficiently low such that the LiDAR sensor can detect a low-intensity reflected pulse 22. For example, darker objects 6 may reflect a lower intensity pulse. Further, objects 6 far away from the sensor 2 may reflect pulses that are greatly dispersed before they arrive at the sensor 2, causing a lower intensity pulse at the sensor 2. Even further, in hazy conditions the intensity of the reflected pulse may also be reduced.

However, it is also desirable that the threshold level be sufficiently high to prevent false readings. For example, if ambient light is sufficiently strong, it may be possible for the sensor 2 to detect a reflected pulse when no object 6 is actually present. An ideal threshold level of pulse intensity is low enough to detect relatively weak pulses, while not so high as to make false readings.

The strength of the signal from the photodiode 60 can also be used to measure the intensity of the received pulse. A stronger intensity reflected pulse 22 will cause a stronger signal from the photodiode. Thus, the strength of the pulse can be estimated from the strength of the signal.

However, the response from avalanche photodiodes can be sensitive to temperature. For example, as the temperature increases the sensitivity of the photodiode decreases, causing the output current to decrease under a given pulse intensity. This effectively causes the photodiode's threshold intensity level to increase. Thus, it may be desirable to compensate for temperature variations of the photodiode 60, such that the threshold level (and the response of the photodiode in general) is held substantially constant. In some embodiments, a bias voltage can be applied in a direction opposite the polarity of the photodiode. This bias voltage affects how strong a pulse is required to reach a breakdown point (e.g., the threshold level) of the photodiode 60. Similarly, the bias voltage can also affect the strength of the response. Thus, temperature fluctuations can affect the response of the photodiode 60, and these changes can be compensated for by adjusting the bias voltage.

One way to adjust for such temperature variations is to measure the temperature of the photodiode 60 and adjust the bias voltage according to the measured temperature. However, temperature readings can include error intrinsic to the temperature sensor. Further, it may be difficult to measure the temperature of the photodiode 60 directly. Thus, it may be necessary to measure the temperature of an object adjacent the photodiode 60 instead of the photodiode itself, introducing additional error. Even further, estimates of the correct bias voltage for a given temperature may also add error, especially as the photodiode might degrade over time.

Thus, it may be preferable to adjust the bias voltage using measurements other than the temperature of the photodiode 60. For example, it may be preferable to measure the response from the avalanche photodiode 60 under a known bias voltage and pulse intensity. If the relationship between these variables and the response from the photodiode 60 under different temperatures is known, then the temperature can be inferred from the known variables. That temperature can then be used to estimate an ideal bias voltage. Alternatively, in some embodiments the ideal bias voltage can be estimated without explicitly determining the temperature. The estimated ideal bias voltage can then be used to determine a desired bias voltage either explicitly or as a desired adjustment to the previous bias voltage. Typically, the desired bias voltage will be the same as the estimated ideal bias voltage, although in some situations they may differ.

Embodiment elements of a LiDAR sensor that can measure the response from an avalanche photodiode to estimate an ideal bias voltage is depicted in FIG. 10. It will be understood that these elements can optionally be added to or otherwise combined with the embodiments described above, such as in FIGS. 2-6. As shown, the laser 30 can connect to a fiber cable 34 that can lead to a fiber cable splitter, such as the fiber cable splitter 36 described above. As discussed above, the fiber cable splitter 36 can then direct an output pulse 20 toward an object 6 to be measured, and a calibration pulse 24 toward the avalanche photodiode 60. Although the calibration pulse 24 is described as providing both the timing functions, described above, and the bias voltage measurement, described here, other embodiments can differ. For example, in some embodiments separate calibration pulses can be used for these two purposes, as the laser's initial pulse can be split further, or the laser can emit multiple pulses.

When the calibration pulse 24 arrives at the avalanche photodiode 60, a first response signal is generated by the photodiode that depends on the calibration pulse, the initial bias voltage, and the temperature of the photodiode. This signal can then be directed toward an analog or digital processor that can estimate an ideal change to the bias voltage, further described below. This change can bring the bias voltage to an estimated ideal bias voltage prior to receipt of the reflected pulse 20. Notably, a "true" ideal bias voltage at the time of receipt of the reflected pulse 20 may be different from the estimated ideal bias voltage, either due to error in the estimation process or further changes in temperature or other conditions between receipt of the calibration pulse 24 and the reflected pulse 20. Further, although in some embodiments the bias voltage can be adjusted within one calibration pulse-reflected pulse cycle, in other embodiments multiple reflected pulses 20 can be received before the bias voltage is adjusted in response to a calibration pulse 24. In some particular embodiments, the device can maintain the applied bias voltage within a certain range from the ideal bias voltage during normal operating conditions. In some embodiments, the applied bias voltage can be within approximately 50 mV of the ideal bias voltage. In further embodiments, the applied bias voltage can be within approximately 25 mV of the ideal bias voltage. In even further embodiments, the applied bias voltage can be within approximately 10 mV of the ideal bias voltage.

FIGS. 10 and 11 depict embodiments of the optical splitter based on fiber optic couplers or splitters. In some preferred embodiments, the fiber optic splitter 36 is a fused biconical taper type fiber coupler. However, in other embodiments the splitter 36 can be another type of splitter such as a planar lightwave circuit (PLC) splitter or a fiber-coupled free-air splitter.

FIG. 10 depicts an embodiment LiDAR sensor for generating one calibration pulse and an external pulse from the light pulse emitted from the laser. The calibration pulse is directed along a short path toward the avalanche photodiode 60 and the external pulse is delayed by fiber loop 38 before being directed toward the target object 6.

FIG. 11 shows another set of embodiment elements of a LiDAR sensor that can measure the response from an avalanche photodiode to estimate an ideal bias voltage, similar to that in FIG. 10. Again, it will be understood that these elements can optionally be added to or otherwise combined with the embodiments described above. Different from FIG. 10, the embodiment depicted in FIG. 11 can include two additional fiber cable splitters 36a, 36b. The calibration pulse 24 can be split into two calibration pulses by the second splitter 36a. One split calibration pulse can then be directed by a fiber cable directly to the second cable splitter 36b. The second calibration pulse can be delayed, e.g., by a fiber cable delay loop 38b. Notably, the second fiber cable splitter 36b can function to combine the two calibration pulses onto a single fiber cable that can output to the avalanche photodiode 60 at different times. In other embodiments, multiple fiber cables can be aimed toward the photodiode 60, such that the second fiber cable splitter 36b can be optionally removed.

Thus, the avalanche photodiode 60 can receive the two calibration pulses at different times. This allows for two separate and distinct measurements of the photodiode's response. Further, it will be understood that the splitters 36a, 36b can be symmetric or asymmetric. In asymmetric embodiments, one of the calibration pulses can be significantly bigger than the other, such that the avalanche photodiode 60 provides responses to each pulse with distinguishable strengths. Providing multiple response strengths through the photodiode 60 can allow for a more accurate measurement of the photodiode temperature and/or the ideal bias voltage. Further, the varying response strengths through the photodiode 60 can facilitate calibration of other elements in the sensor 2, further described below.

FIG. 12 depicts an embodiment circuit diagram including an avalanche photodiode for use in a LiDAR sensor. It will be understood that these elements can optionally be added to or otherwise combined with the embodiments described above. As shown, a bias voltage ($V_{bias}$) can be applied to the cathode of the photodiode 60 to bias the photodiode in reverse and increase the gain of the photodiode. The anode of the photodiode 60 can be measured to provide a signal ($V_{signal}$) which can be measured as a voltage, current, or the like. It will be understood that the signal from the photodiode 60 can be similar to the signal 100, described above and depicted in FIG. 7.

The anode of the photodiode can also connect to additional circuitry that can affect the measured signal from the photodiode 60. As shown, the anode of the photodiode 60 can connect to a downstream resistor (R) and a downstream diode (D) in parallel. This additional circuitry can separate the photodiode's cathode from a lower potential such as a ground. For low signal strengths, the diode (D) can have a relatively high resistance. Thus, substantially all current from the photodiode can pass through the resistor (R), which provides a substantially linear response between voltage and current. This linear response can be advantageous under low signal strengths where a high-precision measurement is desirable.

When the signal from the photodiode 60 becomes stronger the diode can pass current with relatively low resistance compared to the resistor (R). This can cause the signal voltage from the photodiode 60 to increase much slower with respect to the current, which can increase rapidly when the breakdown voltage of the avalanche photodiode is reached. Thus, for stronger signals from the photodiode 60 a substantially logarithmic response can be output, improving measurement over large orders of magnitude.

Further, as discussed above, multiple calibration pulses 24 can be provided at different strengths. These different strength pulses can cause different strength outputs from the photodiode 60, which can lead to different strength inputs to the diode (D) and the resistor (R). In some embodiments, a ratio between the strength of the received pulse (luminosity) at the photodiode and the output current can be substantially constant with respect to the strength of the pulse. Thus, if the relative strengths of the pulses are also constant, the relative strengths of the output from the photodiode 60 should also be substantially constant. Thus, the two responses from the downstream diode (D) and resistor (R) can provide calibration information for these elements, as they may change in response to temperature or other variables.

It will be understood that further variations are possible for the embodiment depicted in FIG. 12. For example, in some embodiments it may be desirable to provide an additional resistor, e.g., in series with the diode (D) and in parallel with the resistor (R). Further, additional outputs and inputs can be included.

In use, the calibration pulse 24 (and/or other calibration pulses) can be used to set an estimated ideal bias voltage, corresponding to an ideal gain of the avalanche photodiode 60. The gain of an avalanche photodiode at a certain bias voltage can be determined as the ratio of its output current under a given amount of incident light at this bias voltage divided by its output current under the same incident light but at the bias voltage corresponding to unity gain. Unity gain occurs when the applied bias voltage is sufficient to carry away photogenerated charge carriers, but is insufficient for accelerating the negative charge carriers to the point of causing impact ionization within the device. Unity gain corresponds to a non-zero bias voltage or voltage range where the avalanche photodiode's photogenerated current remains constant or nearly constant with small changes in bias voltage. At other non-zero bias voltages, the photogenerated current of the avalanche photodiode will change in a nonlinear relationship to the applied bias.

The avalanche photodiode's output strength in response to calibration pulses under various bias voltages can be measured and its breakdown voltage can be measured while the LiDAR sensor is at a substantially constant temperature. Provided the measurements are made substantially faster than the thermal time constant of the avalanche photodiode and pulse strength measurement circuitry, the temperature can be considered substantially constant. Using one or both of these measurements, an optimal gain setting can be specified for its operation in a LiDAR sensor. The bias voltage corresponding to a specified gain can have a fixed offset from the breakdown voltage. Changes in temperature usually cause approximately the same shift in both of these voltages, so the optimal gain setting can be equivalently specified as an offset below the breakdown voltage. Specification of this optimal gain can be performed once, for example at the time of manufacture or otherwise prior to sale or use, and stored in the LiDAR sensor for reference during subsequent operation. Alternatively, the optimal gain can be determined more frequently, such as during operation (such as in the field or on-site) of the LiDAR sensor. The basis for selecting an optimal gain could be, for example, minimizing random variations in range measurements to a fixed target object. One such fixed target could be a flat surface external to the LiDAR sensor with uniform reflectance and securely positioned relative to the sensor. Alternatively, the splitter could be configured to generate two calibration pulses, separated in time, and the second calibration pulse could be used as such a fixed target with a fixed time offset from the first calibration pulse. Another basis for selecting an optimal gain could be maximizing gain without allowing the quiescent current or current noise to exceed a threshold value. The preferred means for maintaining a constant gain of the avalanche photodiode can depend on the stability of the laser and pulse strength measurement circuitry against expected temperature changes in the LiDAR sensor.

Prior to receiving the calibration pulse 24, the avalanche photodiode 60 can be set to receive a bias voltage lower or higher than an expected ideal bias voltage. Setting the initial bias voltage lower can potentially help prevent a strong signal response to the calibration pulse 24 by the photodiode 60 that might not be measured as accurately, e.g., in the logarithmic response region. Further, as discussed above, in some embodiments multiple calibration pulses 24 can be received with potentially different pulse strengths. In further embodiments, the bias voltage can be adjusted after one or more first calibration pulses to an estimated ideal bias voltage, and then adjusted again after one or more second calibration pulses to a more precisely estimated ideal bias voltage.

If the laser can provide sufficiently stable output, such that every emitted pulse has substantially the same peak output intensity, and the pulse strength measurement circuitry maintains constant gain, the measured strength of the calibration pulses can be used to hold constant gain of the avalanche photodiode. A single calibration pulse strength measurement would be sufficient to indicate a required increase or decrease in bias voltage and the approximate magnitude of the required change, based on that which would be needed to keep constant the photodiode's output strength in response to the calibration pulse. Even without an accurate magnitude of the required correction, successive measurements of the calibration pulse strength and applications of bias voltage corrections could be used to iteratively adjust the avalanche photodiode toward the specified gain.

If the laser output varies over time such that the on short time scales approximating the time between emitted pulses, the pulse strength varies substantially, but over long time scales that span many laser pulses the average emitted pulse strength does not vary substantially, many measurements of the strength of the calibration pulses can be averaged together and this average pulse strength can be used to hold substantially constant gain of the avalanche photodiode. In this case the average calibration pulse strength can indicate a desired increase or decrease in bias voltage and the approximate magnitude of the required change. Again, successive measurements of the calibration pulse strength and applications of bias voltage corrections could be used to iteratively adjust the avalanche photodiode to the specified gain.

If the laser's output varies among emitted pulses but its average emitted pulse strength is substantially constant, yet the subsequent pulse strength measurement circuitry is subject to drift in its gain, as would be caused by a change in temperature, a different method could be used to maintain the gain of the avalanche photodiode. A series of measurements of the calibration pulse, repeated under different bias voltages, could be made in less time than the measurement circuitry can be adversely affected by changes in temperature. Thus multiple calibration pulse measurements could be used to determine the strength of the response to the calibration pulse at unity gain. The bias voltage could then be progressively adjusted so that the strength of the response to the calibration pulse becomes the specified gain multiple of the unity gain strength. This would achieve operation of the avalanche photodiode at the specified gain.

If the laser output varies over both short and long time scales, the splitter can be configured to provide two calibration pulses to the avalanche photodiode, separated in time by enough delay to make distinct pulse strength measurements of each. The bias voltage applied to the avalanche photodiode can be changed after the first calibration pulse is received, and before the second calibration pulse is received. The voltage offset between these two calibration bias voltages can be held constant. The ratio of the output from the photodiode for these two calibration pulse strengths under different bias voltages can be taken. As long as each of the two calibration bias voltages are kept at fixed offsets from a bias voltage corresponding to the specified gain, their ratio will remain constant. Since the gain of the avalanche photodiode has a nonlinear relationship to bias voltage, this ratio will be different if the calibration bias voltages change their offsets from the bias voltage for the specified gain (for example, because of a change in temperature). Since the avalanche photodiode will be operating in the linear mode, this ratio will not depend on the absolute strength of the emitted laser pulse. This ratio will also not be affected by changes in the linear gain of the pulse strength measurement circuitry because that gain is canceled out by taking the ratio of strength measurements. The calibration bias voltages can be selected with enough offset between them to yield good sensitivity to changes in gain. It may also be advantageous to set the second calibration bias voltage to the current operating bias voltage of the LiDAR sensor's range measurements so that the delay required between the second calibration pulse and the pulse reflected from the nearest target surface does not need to additionally accommodate another change in bias voltage applied to the avalanche photodiode. The ratio measured when the optimal gain was specified can be stored and used as a reference value. Subsequent measured ratios that are closer to unity than the reference value indicate the calibration bias voltages have moved negative relative to the bias voltage that would yield the specified gain and the operating bias voltage should be increased. Subsequent measured ratios that are further from unity than the reference value indicate the calibration bias voltages have moved positive relative to the bias voltage that would yield the specified gain and the operating bias voltage should be decreased. Successive measurements and corrections can drive the operating bias voltage to match the ratio measured when the optimal gain was specified and achieve operation of the avalanche photodiode at the specified gain.

It may be advantageous to configure the optical splitter using an asymmetric fiber optic splitter to generate two calibration pulses that have different optical pulse strengths. This could be used to reduce the difference in the signal strengths from the photodiode caused by the two calibration pulses while the photodiode is under two different bias voltages. For example, if a symmetric splitter is used with two different bias voltages, two calibration pulses might yield signal responses from the photodiode that are extremely different (such as 10-100 times different) and thus difficult to compare. Alternatively, an asymmetric splitter could cause a stronger calibration pulse to be combined with a smaller bias voltage, and a weaker calibration pulse to be combined with a larger bias voltage. Thus, the asymmetric splitter can be chosen such that the signal outputs from the photodiode resulting from the two calibration pulses are substantially similar (such as differing by no more than 10 times, 5 times, or 2 times, under normal operation). This could allow more accurate measurement of the calibration pulse strengths than may be possible if the two calibration pulses caused the photodiode to output signal strengths that span multiple orders of magnitude.

The calibration pulse 24 can be received by the avalanche photodiode 60 prior to receipt of the object reflected pulse 22. In some embodiments, the time between receipt of a last calibration pulse 24 and the object reflected pulse 22 can be approximately 10 nanoseconds, at least 10 nanoseconds, approximately 100 nanoseconds, or less than 100 nanoseconds. Time between receipt of said pulses can allow the photodiode 60 and other circuitry and processing elements to quench and reset prior to receiving the next pulse. The length of the delay from the fiber cable delay loop 38 can be chosen to ensure adequate time to quench and reset the relevant components. In some embodiments, the bias voltage can be reduced or completely removed during this time to facilitate quenching of the avalanche photodiode 60.

Similarly, a gap in time can be provided between multiple calibration pulses 24. For example, in some embodiments the time between receipt of calibration pulses can be approximately 10 nanoseconds, at least 10 nanoseconds, approximately 100 nanoseconds, or less than 100 nanoseconds. Again, during this time the bias voltage can be optionally reduced or turned off to facilitate quenching of the avalanche photodiode 60, and the length of the fiber cable delay loop 38b can be chosen to ensure sufficient time. For many embodiments the LiDAR sensor's measurement cycle can have a period between approximately 1 microsecond and approximately 10 microseconds. Thermal time constants for the incidental warming and cooling inside a typical LiDAR sensor would often be greater than 1 second. Thus successive measurements and corrections related to controlling the gain of an avalanche photodiode, that are performed as part of the measurement cycle, would happen substantially in real-time, such as at a rate substantially faster than the rate at which the temperature of the avalanche photodiode would fluctuate under normal operating conditions.

Once one or more calibration pulses 24 have been received by the photodiode 60, the bias voltage can be set to a final ideal bias voltage. As discussed above, in some embodiments, the ideal bias voltage can be chosen such that the current gain of the avalanche photodiode 60 caused by a detected pulse having a given strength or light intensity in an operating range of the sensor 2 is held substantially constant. More particularly, in some embodiments the bias voltage can be adjusted such that an offset between the bias voltage and the breakdown voltage (or a bias voltage at unity gain) of the avalanche photodiode in the operating range of the sensor 2 is held constant. In further embodiments, the bias voltage is adjusted to account for temperature variation causing a change in the current gain of the avalanche photodiode 60.

The resulting signal from the photodiode 60 can be received by a processor. The processor can then optionally use the strength of this signal to estimate a temperature of the photodiode 60, and use that temperature to estimate an ideal bias voltage. Alternatively, in some embodiments the temperature need not be directly estimated, and instead an ideal bias voltage (or an ideal change in voltage) can be directly estimated from the calibration signal, as discussed above. The processor can then adjust the bias voltage to the photodiode accordingly. Thus, the bias voltage can be adjusted substantially in real-time, such as at a rate substantially faster than the rate at which the temperature of the photodiode would fluctuate under normal operating conditions. Further, in some embodiments the processor can also quench the photodiode and other elements, as discussed above.

After the one or more calibration pulses 24, as discussed above, an estimated ideal bias voltage can be applied to the avalanche photodiode 60. The photodiode 60 can then receive a reflected pulse 22 from the external object 6. The photodiode 60 can then output a signal that can be received by the same or a different processor and used to estimate a strength of the reflected pulse. The strength of the reflected pulse, combined with the estimated distance to the object 6 (discussed above) can then be used to estimate a reflectance of the object 6. This reflectance can provide information about the object 6, such as its color, material, surface texture, and the like.

In some embodiments, it may be preferable to measure certain characteristics of the photodiode 60 and its response to various pulse intensities prior to general use. For example, the LiDAR sensor can generate pulses toward one or more objects with known reflectances to measure a relationship between the strength of the response from the calibration pulses 24 and the response from the reflected pulses 22. Such prior measurements can allow for variations between individual photodiodes 60, splitters 36, 36a, 36b, lasers 30, and the like.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it may be understood that various omissions, substitutions, and changes in the form and details of the ground contact sensing system, including the sensor components, logical blocks, modules, and processes illustrated may be made without departing from the spirit of the disclosure. As may be recognized, certain embodiments of the systems described herein may be embodied within a form that does not provide all of the features and benefits set forth herein, as some features may be used or practiced separately from others. Additionally, features described in connection with one embodiment can be incorporated into another of the disclosed embodiments, even if not expressly discussed herein, and the prosthetic device having the combination of features still fall within the scope of the inventions.

What is claimed is:

1. A LiDAR sensor comprising:
    a laser configured to emit a narrow electromagnetic pulse;
    an avalanche photodiode configured to receive one or more electromagnetic pulses and output a response signal in response to said pulses, the avalanche photodiode being positioned to receive at least one reflected pulse being reflected by an object external from the LiDAR sensor caused by the laser, the avalanche photodiode having a bias voltage applied to it affecting the response signal;
    a splitter positioned to receive the narrow electromagnetic pulse and split it into at least one external pulse directed toward the object external from the LiDAR sensor and at least one calibration pulse directed toward the avalanche photodiode, the calibration pulse directed toward the photodiode being received by the avalanche photodiode before the pulse reflected by the object; and
    a processor configured to receive response signals from the avalanche photodiode, the processor further configured to adjust the bias voltage according to a response signal caused by the calibration pulse to compensate for temperature changes of the avalanche photodiode.

2. The LiDAR sensor of claim 1, wherein the processor is configured to adjust the bias voltage in real-time in response to response signals caused by the calibration pulse.

3. The LiDAR sensor of claim 1, wherein the temperature of the avalanche photodiode is not directly measured.

4. The LiDAR sensor of claim 1, wherein the processor is configured to adjust the bias voltage such that a gain of the avalanche photodiode in response to a given detected pulse is held substantially constant.

5. The LiDAR sensor of claim 1, wherein the processor is configured to adjust the bias voltage to have a constant offset below a breakdown voltage of the avalanche photodiode.

6. The LiDAR sensor of claim 1, further comprising a resistor between an anode of the avalanche photodiode and a lower potential, and a second diode between the anode of the avalanche photodiode and the lower potential, the anode of the second diode being connected toward the anode of the avalanche photodiode, and the resistor and the second diode being connected in parallel.

7. The LiDAR sensor of claim 1, comprising a means for adjusting response signals from the avalanche photodiode such that the response signal is substantially linear in response to weak pulses and substantially logarithmic in response to strong pulses.

8. The LiDAR sensor of claim 1, wherein the processor is further configured to measure a strength of the reflected pulse.

9. The LiDAR sensor of claim 1, wherein the processor is configured to adjust the bias voltage according to the response signal prior to receiving the reflected pulse.

10. A method for measuring a reflected electromagnetic pulse comprising:
    emitting an electromagnetic pulse;
    splitting the emitted electromagnetic pulse into at least an external pulse and a calibration pulse;
    directing the calibration pulse toward an avalanche photodiode;
    directing the external pulse toward an object to be measured, causing a reflected pulse;
    applying an initial bias voltage to the avalanche photodiode;
    receiving with the avalanche photodiode the calibration pulse while the avalanche photodiode is under the initial bias voltage;
    measuring a response from the avalanche photodiode caused by the calibration pulse;
    applying a desired bias voltage to the avalanche photodiode, using the measured response caused by the calibration pulse, to adjust for temperature changes of the avalanche photodiode;
    receiving with the avalanche photodiode the reflected pulse; and
    measuring a response from the avalanche photodiode caused by the reflected pulse.

11. The method of claim 10, further comprising the step of estimating the strength of the reflected pulse.

12. The method of claim 10, wherein the method is repeated continuously, such that the desired bias voltage is applied to compensate for temperature changes of the avalanche photodiode in real-time.

13. The method of claim 10, wherein the temperature of the avalanche photodiode is not directly measured to compensate for temperature changes of the avalanche photodiode.

14. The method of claim 10, further comprising estimating a desired bias voltage based on the measured response from the avalanche photodiode caused by the calibration pulse.

15. The method of claim 10, further comprising estimating a temperature of the avalanche photodiode based on the measured response from the avalanche photodiode caused by the calibration pulse.

16. The method of claim 15, wherein the step of estimating is done without measuring a temperature of the avalanche photodiode.

17. The method of claim 10, further comprising adjusting the response from the avalanche photodiode caused by the reflected pulse such that the strength of the response is substantially linear in response to weak pulses and substantially logarithmic in response to strong pulses.

18. The method of claim 10, further comprising:
    splitting the calibration pulse to create at least a second calibration pulse;
    delaying the second calibration pulse;
    directing the second calibration pulse toward the avalanche photodiode;
    receiving with the avalanche photodiode the second calibration pulse after receiving the calibration pulse and before receiving the reflected pulse; and
    measuring a response from the avalanche photodiode caused by the second calibration pulse, wherein the step of applying a desired bias voltage to the avalanche photodiode, using the measured response caused by the calibration pulse further comprises using the measured response from the second calibration pulse.

19. The method of claim 10, wherein the step of applying a preferred bias voltage to the avalanche photodiode, using the measured response caused by the calibration pulse comprises adjusting the bias voltage such that a gain of the avalanche photodiode in response to a given detected pulse is held substantially constant.

20. The method of claim 10, wherein the step of applying a preferred bias voltage to the avalanche photodiode, using the measured response caused by the calibration pulse comprises adjusting the bias voltage such that an offset between the bias voltage and a breakdown voltage of the avalanche photodiode is held substantially constant.

21. The method of claim 10, wherein the reflected pulse is received while the avalanche photodiode is under the desired bias voltage.

22. A LiDAR sensor comprising:
a laser configured to emit a narrow electromagnetic pulse;
an avalanche photodiode configured to receive one or more electromagnetic pulses and output a response signal in response to said pulses, the avalanche photodiode being positioned to receive at least one reflected pulse being reflected by an object external from the LiDAR sensor caused by the laser, the avalanche photodiode having a bias voltage affecting the response signal;
a splitter positioned to receive the narrow electromagnetic pulse and split it into at least one external pulse directed toward the object external from the LiDAR sensor and at least one calibration pulse directed toward the avalanche photodiode, the calibration pulse directed toward the avalanche photodiode being received by the avalanche photodiode before the pulse reflected by the object; and
a means for adjusting the bias voltage to compensate for temperature variations without measuring temperature.

23. The LiDAR sensor of claim 22, further comprising a means for adjusting the response from the avalanche photodiode caused by the reflected pulse such that the strength of the response is substantially linear in response to weak pulses and substantially logarithmic in response to strong pulses.

* * * * *